(12) United States Patent  
Augenbraun et al.

(10) Patent No.: US 11,839,984 B2  
(45) Date of Patent: *Dec. 12, 2023

(54) ROBOTIC TOUCH PERCEPTION

(71) Applicant: Aeolus Robotics, Inc., San Francisco, CA (US)

(72) Inventors: Joseph Ellis Augenbraun, San Francisco, CA (US); Gaurav Rekhi, San Francisco, CA (US)

(73) Assignee: AEOLUS ROBOTICS, INC., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,361

(22) Filed: May 11, 2022

(65) Prior Publication Data

US 2022/0347851 A1 Nov. 3, 2022

Related U.S. Application Data

(63) Continuation of application No. 16/815,001, filed on Mar. 11, 2020, now Pat. No. 11,345,039, which is a
(Continued)

(51) Int. Cl.
*B25J 9/16* (2006.01)
*B25J 13/08* (2006.01)
(Continued)

(52) U.S. Cl.
CPC ......... *B25J 9/1694* (2013.01); *B25J 11/0085* (2013.01); *B25J 13/081* (2013.01);
(Continued)

(58) Field of Classification Search
CPC ........ B25J 13/08; B25J 13/081; B25J 9/1694; B65D 17/4012; G01B 11/24;
(Continued)

(56) References Cited

U.S. PATENT DOCUMENTS

| 4,818,173 A | 4/1989 | Khusro |
| 5,234,303 A | 8/1993 | Koyano |

(Continued)

FOREIGN PATENT DOCUMENTS

| JP | H05-046239 A | 2/1993 |
| JP | H08-286746 A | 11/1996 |

(Continued)

OTHER PUBLICATIONS

Castellanos, J.A. et al., "Multisensor Fusion for Simultaneous Localization and Map Building," IEEE Transactions on Robotics and Automation, vol. 17, No. 6, Dec. 2001, 8 pages.

(Continued)

*Primary Examiner* — Timothy R Waggoner
(74) *Attorney, Agent, or Firm* — FENWICK & WEST LLP

(57) ABSTRACT

An apparatus such as a robot capable of performing goal oriented tasks may include one or more touch sensors to receive touch perception feedback on the location of objects and structures within an environment. A fusion engine may be configured to combine touch perception data with other types of sensor data such as data received from an image or distance sensor. The apparatus may combine distance sensor data with touch sensor data using inference models such as Bayesian inference. The touch sensor may be mounted onto an adjustable arm of a robot. The apparatus may use the data it has received from both a touch sensor and distance sensor to build a map of its environment and perform goal oriented tasks such as cleaning or moving objects.

22 Claims, 10 Drawing Sheets

Related U.S. Application Data continuation of application No. 14/963,189, filed on Dec. 8, 2015, now Pat. No. 10,618,174.

(60) Provisional application No. 62/139,172, filed on Mar. 27, 2015, provisional application No. 62/103,573, filed on Jan. 15, 2015, provisional application No. 62/089,416, filed on Dec. 9, 2014.

(51) Int. Cl.
  *B25J 19/02* (2006.01)
  *B25J 11/00* (2006.01)
  *G05D 1/02* (2020.01)

(52) U.S. Cl.
  CPC .......... *B25J 13/085* (2013.01); *B25J 13/086* (2013.01); *B25J 19/021* (2013.01); *B25J 19/026* (2013.01); *G05D 1/0274* (2013.01); *G05B 2219/40574* (2013.01); *G05B 2219/40625* (2013.01); *Y10S 901/10* (2013.01)

(58) Field of Classification Search
  CPC ........... G05B 2219/40574; G05B 2219/40625; G05D 1/0274
  See application file for complete search history.

(56) References Cited

U.S. PATENT DOCUMENTS

| | | | |
|---|---|---|---|
| 5,459,329 | A | 10/1995 | Sinclair |
| 5,740,328 | A | 4/1998 | Ravani et al. |
| 6,459,955 | B1 * | 10/2002 | Bartsch ................ G05D 1/0221 318/587 |
| 9,757,862 | B2 | 9/2017 | Alt et al. |
| 9,868,208 | B2 | 1/2018 | Meier |
| 10,618,174 | B2 * | 4/2020 | Augenbraun .......... B25J 13/081 |
| 2004/0236469 | A1 | 11/2004 | Moridaira et al. |
| 2006/0241827 | A1 | 10/2006 | Fukuchi et al. |
| 2010/0306159 | A1 | 12/2010 | Platt et al. |
| 2011/0153138 | A1 * | 6/2011 | Sekiya ................ G05D 1/0217 701/26 |
| 2011/0288684 | A1 | 11/2011 | Farlow et al. |
| 2012/0121161 | A1 | 5/2012 | Eade et al. |
| 2012/0221187 | A1 | 8/2012 | Jeon |
| 2012/0224773 | A1 | 9/2012 | Sweet et al. |
| 2013/0090763 | A1 | 4/2013 | Simaan et al. |
| 2013/0238129 | A1 | 9/2013 | Rose et al. |
| 2014/0139329 | A1 | 5/2014 | Ramstein et al. |
| 2015/0178412 | A1 | 6/2015 | Grau |
| 2015/0371440 | A1 | 12/2015 | Pirchheim et al. |
| 2016/0082597 | A1 | 3/2016 | Gorshechnikov et al. |
| 2017/0123066 | A1 | 5/2017 | Coddington et al. |
| 2018/0210445 | A1 * | 7/2018 | Choi ..................... G05D 1/0238 |

FOREIGN PATENT DOCUMENTS

| | | |
|---|---|---|
| JP | H11-192196 A | 7/1999 |
| JP | 2007-219645 A | 8/2007 |
| JP | 2007-319989 A | 12/2007 |
| JP | 2008-023630 A | 2/2008 |
| JP | 2010-172992 | 8/2010 |
| WO | WO 2006/006624 A1 | 1/2006 |

OTHER PUBLICATIONS

Extended European Search Report, European Patent Application No. 15867279.0, dated Jul. 27, 2018, 7 pages.
International Search Report and Written Opinion, PCT application No. PCT/IB2015/59453, dated Apr. 1, 2016, 17 pages.
Japan Patent Office, Notification of Reasons for Refusal, Japanese Patent Application No. 2017-531769, dated Oct. 1, 2019, 16 pages.
Japan Patent Office, Notification of Reasons for Refusal, Japanese Patent Application No. 2017/531769, dated Apr. 17, 2020, 8 pages.
Japan Patent Office, Office Action, JP Patent Application No. 2020-184377, dated Nov. 2, 2021, 6 pages.
United States Office Action, U.S. Appl. No. 16/815,001, dated Nov. 29, 2021, 7 pages.
United States Office Action, U.S. Appl. No. 16/815,001, dated Aug. 20, 2021, 8 pages.
Japan Patent Office, Notification of Reasons for Refusal, Japanese Patent Application No. 2022-127712, dated Jul. 4, 2023, 9 pages.

* cited by examiner

ROBOTIC TOUCH PERCEPTION

CROSS-REFERENCE TO RELATED APPLICATIONS

This application is a continuation of U.S. patent application Ser. No. 16/815,001, filed on Mar. 11, 2020, which is a continuation of U.S. patent application Ser. No. 14/963,189, filed on Dec. 8, 2015, now U.S. Pat. No. 10,618,174, which claims the benefit of U.S. Provisional Application No. 62/089,416, filed on Dec. 9, 2014. The application Ser. No. 14/963,189 also claims benefit of U.S. Provisional Application No. 62/103,573, filed on Jan. 15, 2015, and U.S. Provisional Application No. 62/139,172, filed on Mar. 27, 2015. All of the above referenced applications are hereby incorporated by reference in their entirety.

FIELD

This patent specification relates to the field of machines and apparatuses such as robots capable of receiving touch sensor data to perform goal oriented tasks using data from both touch and image sensors.

BACKGROUND

While other science fiction mainstays like space travel, global instantaneous communication and self-driving cars have come to fruition, general-purpose household robots have remained out of reach, with even the most advanced research robots struggling to do simple tasks like folding towels.

One set of tasks that would be particularly desirable to automate are tasks related to cleaning. This involves moving objects, and then cleaning surfaces, possibly replacing those objects that belong in the particular space. This patent specification describes methods and apparatus to perform these functions.

Household robots exist today. Most household robots sold today are robotic vacuum cleaners. The best of these robots sense their environment for mapping purposes, but all household vacuuming robots lack the ability to manipulate objects on purpose (although they may accidentally push some objects around the floor).

Some robotic toys have robotic arms that can manipulate small objects. Generally these robots are limited to remote control operation, or simple pre-programmed sequences that sometimes follow decision-trees based on sensor input. At best these toys have very limited perception, such as the ability to follow a line drawn on a piece of paper, or to seek or avoid a light. In no way do these toys perform the desired task of cleaning a surface or space.

Much more advanced perception and object-recognition has been demonstrated using research robots including advanced tasks such as folding towels. The authors of this patent specification are unaware, however, of any robot or other device that demonstrated the task of autonomously cleaning a space beyond the floor. The nearest prior art known to the authors include a video of a PR1 research robot appearing to clean a room, which in actual fact is remote-controlled by one of the researchers. The other prior art known to the authors is a robot known as "Fetch" built by SRI of Menlo Park, CA that can grasp and pick up objects and identify them. This robot does not include the capability to then put away the object and does not have any capability to clean surfaces. One of the techniques described in this patent specification is touch perception. Some researchers have demonstrated the sense of touch, often in the context of remote-control applications that include haptics. However, other than bumper switches on robotic vacuums, the authors of this patent specification are not aware of any demonstration of touch perception that is used for autonomous object and/or environment recognition.

Therefore, a need exists for novel methods of robotic perception which may be used for autonomous object and/or environment recognition. There is a further need for novel methods for combining touch sensor data with visual sensor data to autonomously perform an activity.

SUMMARY

It is one object of the present invention to provide an apparatus such as a robot capable of performing goal oriented tasks. In some embodiments, the apparatus uses one or more touch sensors to receive touch perception feedback on the location of objects and structures within an environment. In preferred embodiments, the apparatus may include a fusion engine to combine touch perception data with other types of sensor data such as data received from an image or distance sensor. In some embodiments, the apparatus may combine distance sensor data with touch sensor data using Bayesian inference models. In further embodiments, the touch sensor may be mounted onto the arm of a robot to detect level of pressure and direction of pressure. The apparatus may then use the data it has received from both a touch sensor and a distance sensor to build a map of its environment and perform goal oriented tasks such as cleaning or moving objects.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New methods of building an environment map of an environment using robotic perception discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
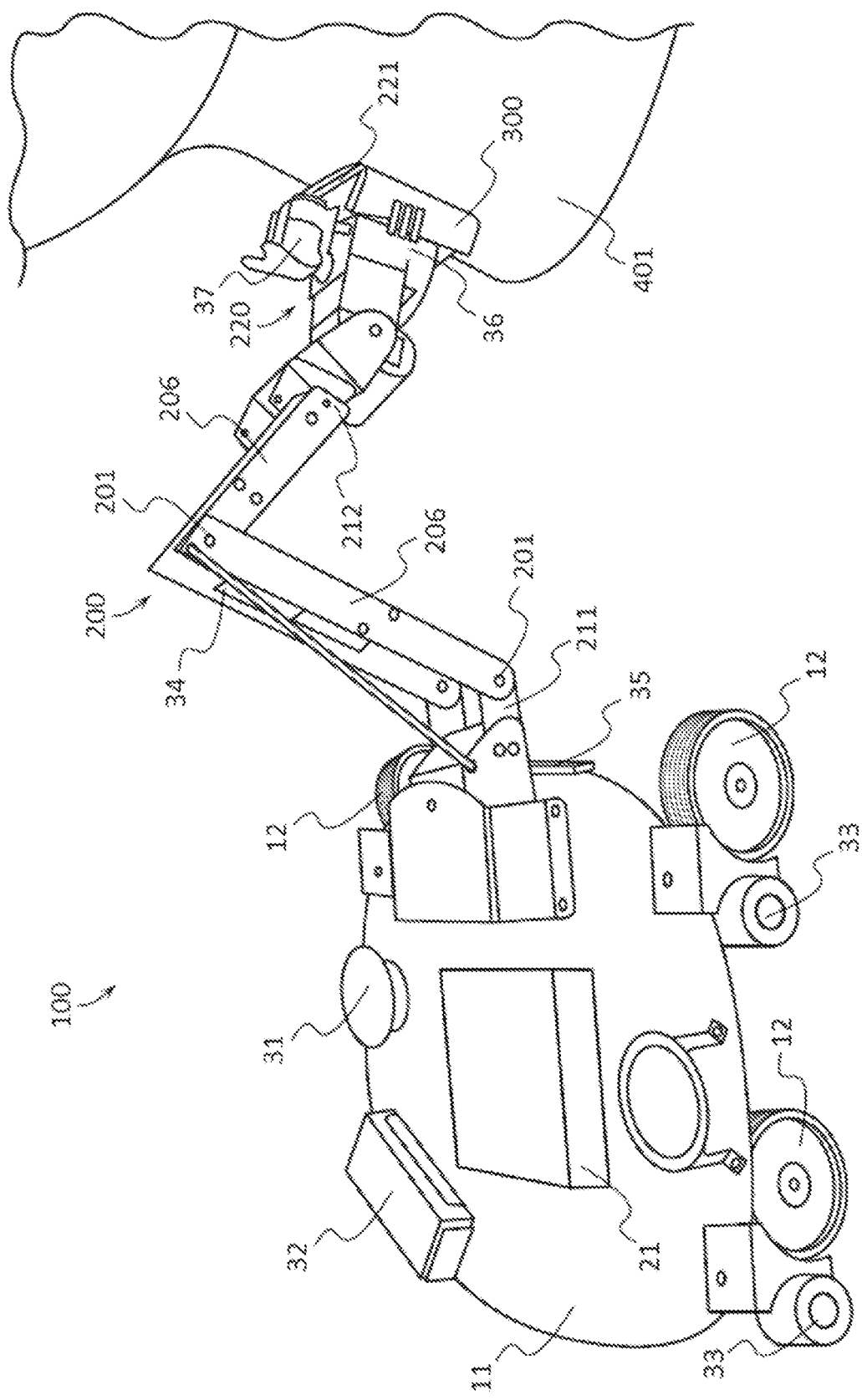
FIG. 1 depicts a perspective view of an example of a mobile robot apparatus comprising a movable arm according to various embodiments described herein.

The present invention will now be described by example and through referencing the appended figures representing preferred and alternative embodiments. FIG. 1 illustrates an example of a mobile robot apparatus ("the robot") 100 according to various embodiments. In some embodiments, a robot may be any machine or apparatus capable of executing a task. In the non-limiting example shown by FIG. 1, the robot 100 comprises a body 11 with a movable arm ("the arm") 200 operably coupled to the body 11. One or more transportation conveyances 12 which may facilitate the movement of the robot 100 across surfaces, such as the ground and floors, and/or through the air, such as propellers and other air transportation enabling devices, may also be coupled to the body 11. A body motor 33 may be coupled to one or more transportation conveyances 12 and configured to operate the transportation conveyances 12. In alternative embodiments, the body 11 may not be movable and the robot 100 may be generally stationary with a movable arm 200. A power source 32 may provide power to a processing unit 21 which may be in electrical communication with the functional elements of the body 11 and/or arm 200. The arm 200 may be coupled to the body 11 at a proximal end 211 and coupled to an effector suite 220 at a distal end 212 with one or more sections 206 and joints 201 connecting the proximal end 211 to the distal end 212. An accessory 300 may be coupled to the effector suite 220, such as to an accessory mount 221, which may be directed into contact with objects 401 and surfaces which may be found in an environment. The robot 100 may also comprise one or more touch sensors 35, 36, which may receive touch input which may be used to form a map of the environment and the objects 401 and surfaces which may be found in the environment. Additionally, the robot 100 may comprise a distance sensor 37 which may provide distance information which may also be used to form a map of the environment and the objects 401 and surfaces which may be found in the environment.

Figure 2:
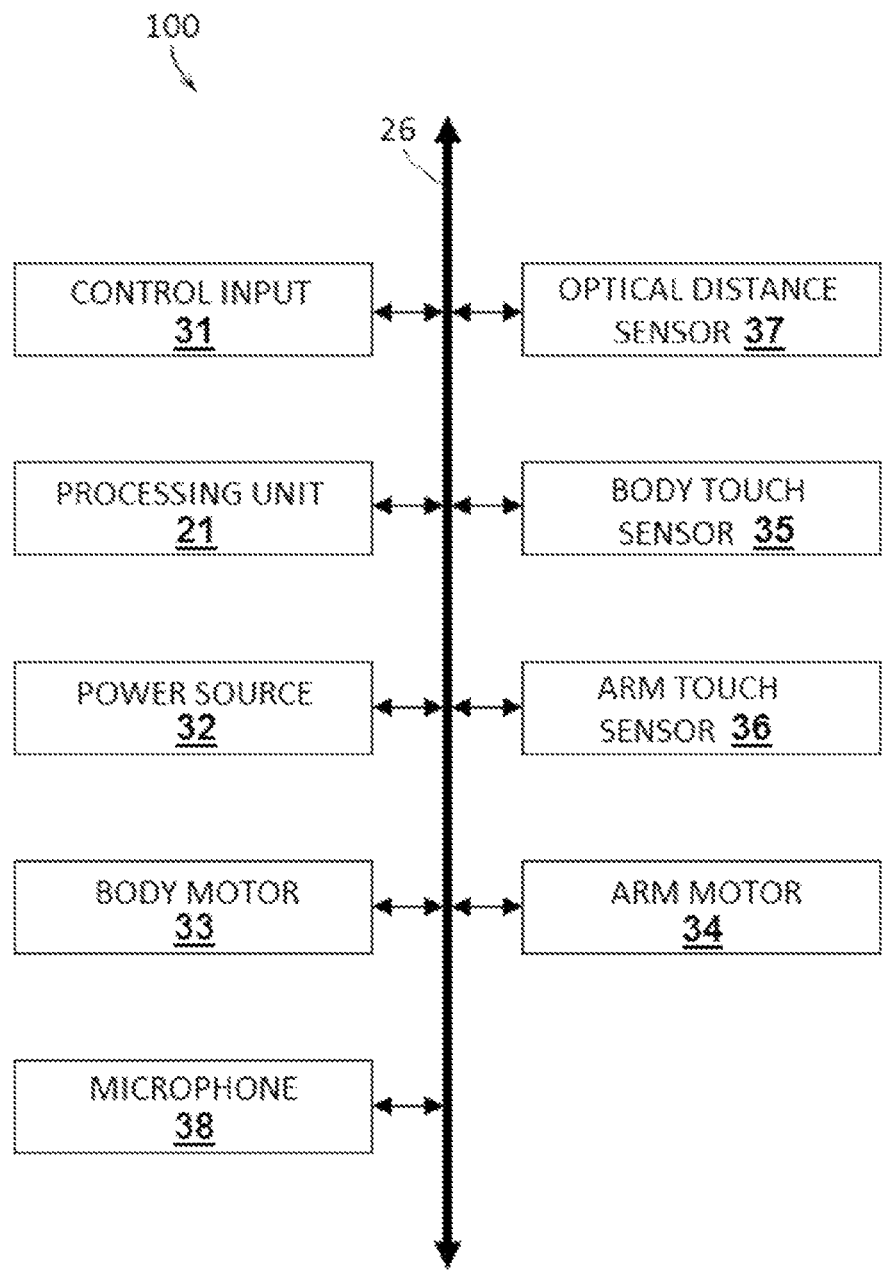
FIG. 2 illustrates a block diagram showing some of the some of the elements an example of a mobile robot apparatus according to various embodiments described herein.

FIG. 2 illustrates a block diagram showing some of the some of the elements an example of a mobile robot apparatus 100 according to various embodiments described herein. In preferred embodiments, a robot 100 may comprise one or more control inputs 31, processing units 21, power sources 32, body motors 33, arm motors 34, body touch sensors 35, arm touch sensors 36, distance sensors 37, and/or microphones 38. It should be appreciated by those of ordinary skill in the art that FIG. 2 depicts the robot 100 in an oversimplified manner, and a practical embodiment may include additional components or elements and suitably configured to support known or conventional physical components and operating features that are not described in detail herein.

Optionally, a robot 100 may comprise one or more control inputs 31 that a user may interact with such as turnable control knobs, depressable button type switches, slide type switches, rocker type switches, or any other suitable input that may be used to electrically communicate user input to the robot 100 such as to the processing unit. For example, a control input 31 may comprise a switch that may be manipulated by a user to control a function of the robot 100.

In some embodiments, a robot 100 may comprise a power source 32 which may provide electrical power to any component that may require electrical power. A power source 32 may comprise a battery, such as a lithium ion battery, nickel cadmium battery, alkaline battery, or any other suitable type of battery, a fuel cell, a capacitor, or any other type of energy storing and/or electricity releasing device. In further embodiments, a power source 32 may comprise a power cord, kinetic or piezo electric battery charging device, a solar cell or photovoltaic cell, and/or inductive charging or wireless power receiver.

In some embodiments, a robot 100 may comprise one or more body motors 33 which may be used to move the robot 100 through one or more transportation conveyances 12. A body motor 33 may comprise a brushed DC motor, brushless DC motor, switched reluctance motor, universal motor, AC polyphase squirrel-cage or wound-rotor induction motor, AC SCIM split-phase capacitor-start motor, AC SCIM split-phase capacitor-run motor, AC SCIM split-phase auxiliary start winding motor, AC induction shaded-pole motor, wound-rotor synchronous motor, hysteresis motor, synchronous reluctance motor, pancake or axial rotor motor, stepper motor, or any other type of electrical or non-electrical motor. One or more transportation conveyances 12 may be configured to facilitate the movement of the robot 100 across a surface. In some embodiments, a transportation conveyance 11 may comprise a wheel, as shown by the example of FIG. 1, a caster, a tread or track, a low friction pad or bumper, a low friction plate, a ski, a pontoon, or any other suitable device configured to reduce the friction between the robot 100 and the surface over which it is desired to be moved. In further embodiments, a transportation conveyance 12 may comprise a propeller, miniaturized jet engine, or any other air transportation enabling device which may allow the robot 100 to fly or function similar to a drone air craft. In further embodiments a transportation conveyance 12 may comprise a fin, a water jet, a screw, or any other water transportation enabling device which may allow the robot 100 to move on or below the surface of water. In further embodiments a transportation conveyance 12 may comprise a rocket, and ion drive, a gryroscope, or any other space transportation enabling device which may allow the robot 100 to move in space.

In some embodiments, a robot 100 may comprise one or more arm motors 34 which may be used to move one or more sections 206 and/or other components of an arm 200. An arm motor 34 may comprise any suitable type of motor such as may be used for a body motor 33. In preferred embodiments, an arm motor 34 may comprise an actuator which may be operated by a source of energy, typically electric current, hydraulic fluid pressure, or pneumatic pressure, and converts that energy into motion. Examples of actuators may include comb drives, digital micromirror devices, electric motors, electroactive polymers, hydraulic cylinders, piezoelectric actuators, pneumatic actuators, servomechanisms, thermal bimorphs, screw jacks, or any other type of hydraulic, pneumatic, electric, mechanical, thermal, and magnetic type of actuator.

In some embodiments, a robot 100 may comprise one or more body touch sensors 35 and/or arm touch sensors 36. Generally, a touch sensor 35, 36, may detect contact between an object or surface and the component that the touch sensor 35, 36, is coupled to. In preferred embodiments, a touch sensor 35, 36, may be configured to detect the force or pressure between an object or surface and the component that the touch sensor 35, 36, is coupled to when the surface or object is in contact with the component that the touch sensor 35, 36, is coupled to. A body touch sensor 35 may be coupled to the body 11 of a robot 100 and may be configured to detect contact and/or the pressure during contact between an object or surface and the component of the body 11 that the body touch sensor 35 is coupled to. An arm touch sensor 36 may be coupled to the arm 200 of a robot 100 and may be configured to detect contact and/or the pressure during contact between an object or surface and the component of the arm 200 that the arm touch sensor 36 is coupled to.

In some embodiments, a robot 100 may comprise one or more distance sensors 37. A distance sensor 37 may include sensors such as fixed (single beam) or rotating (sweeping) Time-of-Flight (TOF) or structured light based laser rangefinders, 3D High Definition LiDAR, 3D Flash LIDAR, 2D or 3D sonar sensors and one or more 2D cameras. Further, a distance sensor 37 may also include Passive thermal infrared sensors, Photocell or reflective sensors, Radar sensors, Reflection of ionising radiation sensors, Sonar sensors, such as active or passive, Ultrasonic sensors, Fiber optics sensors, Capacitive sensors, Hall effect sensors, or any other sensor able to detect the presence of nearby objects and surfaces without any physical contact. Generally, a distance sensor 37 may comprise any type of sensor which is able to provide information which describes the distance between the distance sensor 37 and the detected object or surface.

In some embodiments, a robot 100 may comprise one or more microphones 38. A microphone 38 may be configured to pick up or record audio information from the environment around the robot 100 and preferably from a user speaking to or issuing voice commands to the robot 100. In preferred embodiments, a microphone 38 may comprise any acoustic-to-electric transducer or sensor that converts sound in air into an electrical signal. In further embodiments, a microphone 38 may comprise any type of microphone such as electromagnetic induction microphones (dynamic microphones), capacitance change microphones (condenser microphones), and piezoelectricity microphones (piezoelectric microphones) to produce an electrical signal from air pressure variations. In further embodiments, a microphone 38 may be in network communication with a robot 100 and may include microphones that use digital communication to send information, including microphones in remote controls, smart phones, tablet computers, laptop computers, and other like electronic devices that have the ability to translate sound into data packets for transmission to the robot 100, such as through a wired or wireless connection, including implementations in which pre-processing is performed by the electronic device comprising the microphone, including voice recognition, before being communicated to the robot 100.

Figure 3:
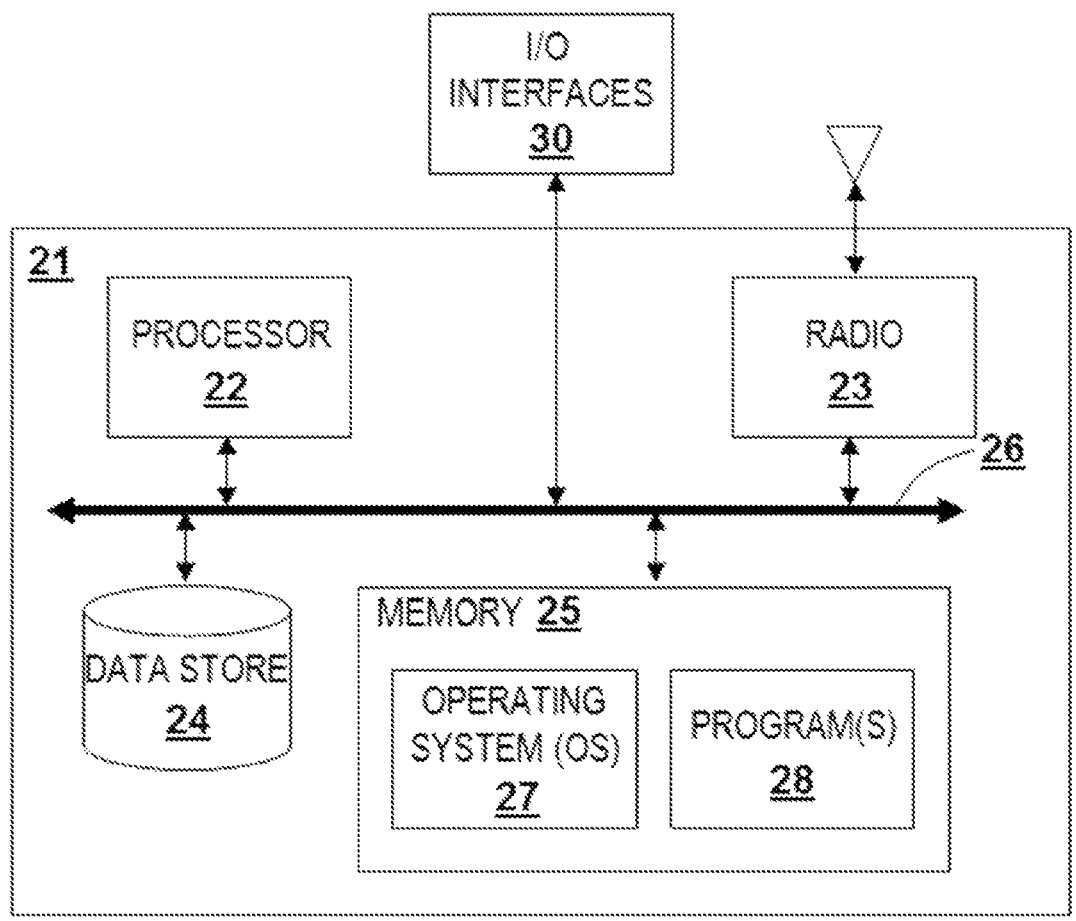
FIG. 3 shows a block diagram showing some of the elements an example of a processing unit of a mobile robot apparatus may comprise according to various embodiments described herein.

FIG. 3 depicts a block diagram showing some of the elements an example of a processing unit of a mobile robot apparatus 100 (FIGS. 1 and 2) may comprise according to various embodiments described herein. In some embodiments and in the present example, the robot 100 can be a digital device that, in terms of hardware architecture, comprises one or more processing units 21 which generally include one or more processors 22, and optionally input/output (I/O) interfaces 30, optional radios 23, data stores 24, and memory 25. It should be appreciated by those of ordinary skill in the art that FIG. 3 depicts the processing unit 21 in an oversimplified manner, and a practical embodiment may include additional components or elements and suitably configured processing logic to support known or conventional operating features that are not described in detail herein. The components and elements (22, 30, 23, 24, and 25) are communicatively coupled via a local interface 26. The local interface 26 can be, for example but not limited to, one or more buses or other wired or wireless connections, as is known in the art. The local interface 26 can have additional elements, which are omitted for simplicity, such as controllers, buffers (caches), drivers, repeaters, and receivers, among many others, to enable communications. Further, the local interface 26 may include address, control, and/or data connections to enable appropriate communications among the aforementioned components.

The processor 22 is a hardware device for executing software instructions. The processor 22 can be any custom made or commercially available processor, a central processing unit (CPU), an auxiliary processor among several processors associated with the processing unit 21, a semiconductor-based microprocessor (in the form of a microchip or chip set), or generally any device for executing software instructions. When the processing unit 21 is in operation, the processor 22 is configured to execute software stored within the memory 25, to communicate data to and from the memory 25, and to generally control operations of the robot 100 pursuant to the software instructions. In an exemplary embodiment, the processor 22 may include a mobile optimized processor such as optimized for power consumption and mobile applications.

The I/O interfaces 30 may include one or more control inputs 31, processing units 21, power sources 32, body motors 33, arm motors 34, body touch sensors 35, arm touch sensors 36, and/or distance sensors 37. I/O interfaces 30 may be used to receive and record environmental information and to control one or more functions of a robot 100 to allow it to interact and move through an environment. The I/O interfaces 30 can also include, for example, a serial port, a parallel port, a small computer system interface (SCSI), an infrared (IR) interface, a radio frequency (RF) interface, a universal serial bus (USB) interface, and the like which may be used to send and receive data to other electronic devices such as computer devices, programming units, and controllers.

An optional radio 23 enables wireless communication to an external access device or network. In some embodiments, a radio 23 may operate on a WIFI band and may communicate with one or more electronic devices over a wireless network allowing data to be sent and received by the robot 100. Any number of suitable wireless data communication protocols, techniques, or methodologies can be supported by the radio 23, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

A data store 24 may be used to store data. The data store 24 may include any of volatile memory elements (e.g., random access memory (RAM, such as DRAM, SRAM, SDRAM, and the like)), nonvolatile memory elements (e.g., Flash memory, ROM, hard drive, tape, CDROM, and the like), and combinations thereof. Moreover, the data store 24 may incorporate electronic, magnetic, optical, and/or other types of storage media.

The memory 25 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 25 may incorporate electronic, magnetic, optical, and/or other types of storage media. Note that the memory 25 may have a distributed architecture, where various components are situated remotely from one another, but can be accessed by a processor 22. The software in memory 25 can include one or more software programs, each of which includes an ordered listing of executable instructions for implementing logical functions.

Figure 11:
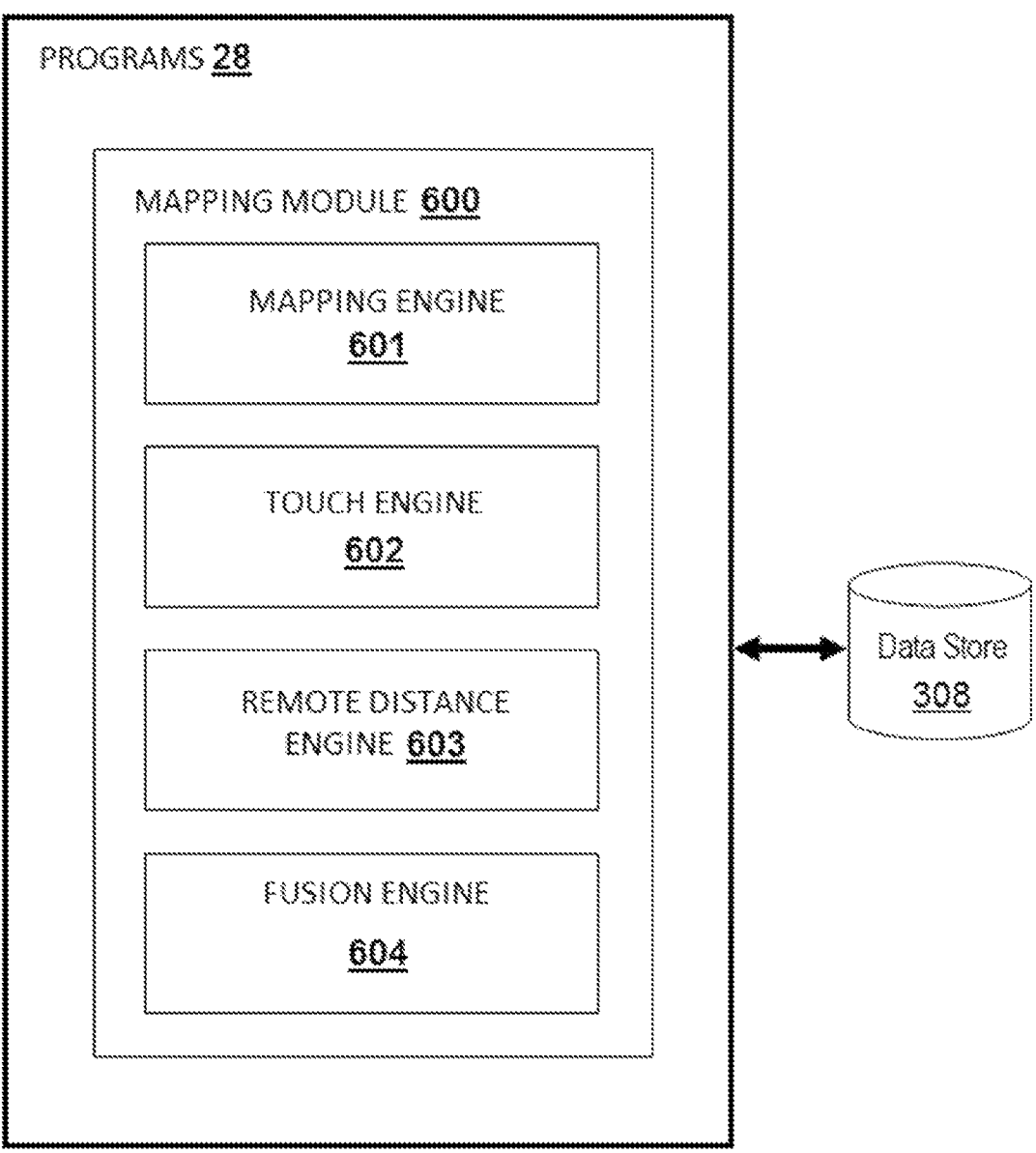
FIG. 11 illustrates a block diagram illustrating some modules which may function as software rules engines and which may provide robotic touch perception according to various embodiments described herein.

In the example of FIG. 3, the software in the memory system 25 includes a suitable operating system (O/S) 27 and programs 28. The operating system 27 essentially controls the execution of input/output interface 30 functions, and provides scheduling, input-output control, file and data management, memory management, and communication control and related services. The operating system 27 may be, for example, LINUX (or another UNIX variant), Android (available from Google), Symbian OS, RobotOS (ROS), Microsoft Windows CE, Microsoft Windows 7 Mobile, iOS (available from Apple, Inc.), webOS (available from Hewlett Packard), Blackberry OS (Available from Research in Motion), and the like. The programs 28 may include various applications, add-ons, etc. configured to provide end user functionality with the apparatus 100. For example, exemplary programs 28 may include, but not limited to, environmental variable analytics, environment mapping, and modulation of input/output interface 30 functions. In a typical example as shown in FIG. 11, programs 28 for robotic touch perception may comprise a mapping module 600 which may further comprise a mapping engine 601, touch engine 602, a distance engine 603, fusion engine 604, and/or functional equivalents.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The processing unit 21 may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by the processor 22. In addition, the main memory may be used for storing temporary variables or other intermediate information during the execution of instructions by the processor 22. The processing unit 21 may further include a read only memory (ROM) or other static storage device (e.g., programmable ROM (PROM), erasable PROM (EPROM), and electrically erasable PROM (EEPROM)) coupled to the bus for storing static information and instructions for the processor 22.

Figure 4:
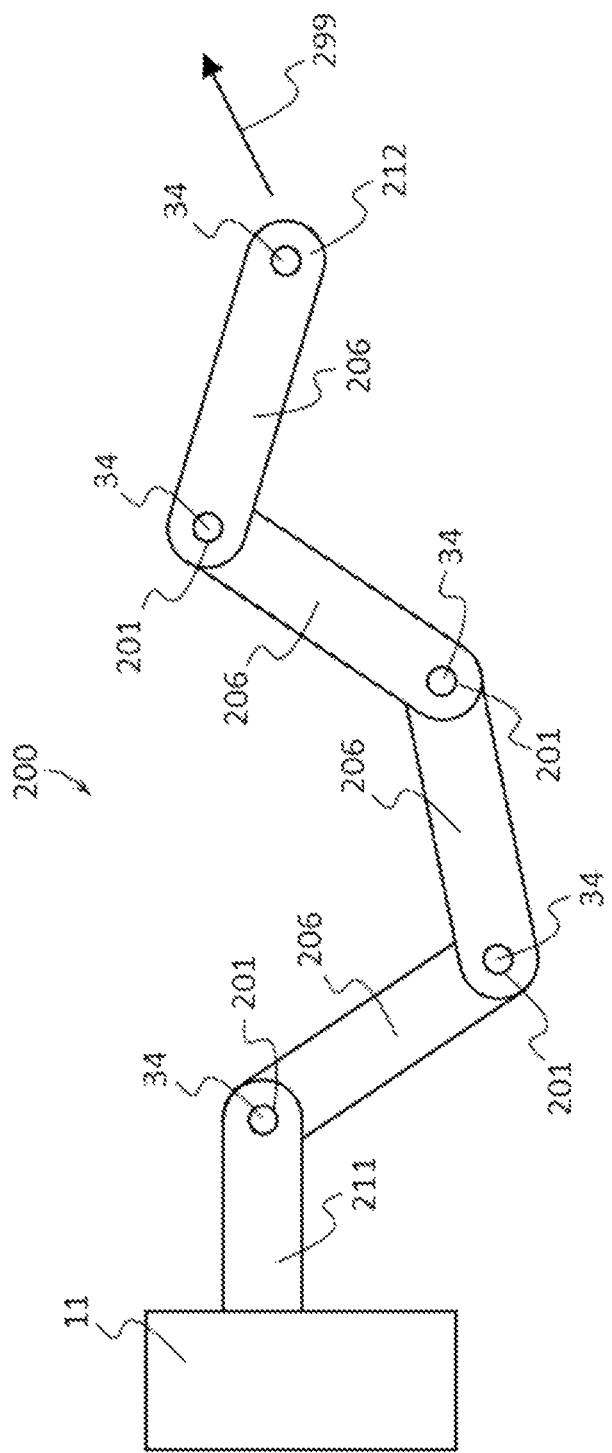
FIG. 4 depicts a perspective view of an example of a movable arm according to various embodiments described herein.

In some embodiments, the robot may include the ability to detect contact between the robot and objects or surfaces in an environment. This contact detection may be implemented by one or more touch sensors, such as a body touch sensor 35 and/or an arm touch sensor 36. In further embodiments, a touch sensor 35, 36, may operate through detection of displacement of a surface on the robot 100, for example the depression of a bumper, deformation of an electromechanical skin assembly 50 (FIG. 5), or other electromechanical detection device that is able to provide electrical communication upon contact between the device and an object or surface. In further embodiments, a touch sensor 35, 36, may operate by detecting the force applied to a joint on the robot 100 as being greater than the force typically required to move the joint. In further embodiments, a touch sensor 35, 36, may operate by detecting the force that an actuator on the robot is exerting, e.g. by directly measuring torque or e.g. by measuring electrical current required by the actuator or e.g. by measuring the error between the target position and the actual position of the actuator. In further embodiments, a touch sensor 35, 36, may comprise an optical or ultrasonic sensor, which may be able to detect contact between a portion of the robot 100 and objects or surfaces in an environment by detecting very close proximity In some embodiments, detecting the force that an actuator on the robot 100 is exerting may be accomplished by measuring the current flowing through a group of motors 34 or actuators in an arm 200, examples of which is shown in FIGS. 1 and 4, at the ground connection to determine the force being applied by that set of actuators as a set. FIGS. 1 and 4 show an example of an arm 200 attached to the body 11 of a robot 100 according to various embodiments described herein. An arm 200 may comprise an arbitrary number of joints, represented in this illustration by hinge joints 201 with one or more arm motors 34 controlling the movement of one or more hinge joints 201. In this example, the arm 200 is applying force 299 in the direction shown, with resisting force being applied in equal magnitude in the opposite direction. An arm 200 may comprise any number, such as one, two, three, four, five, six, seven, or more joints 201, arm motors 34, and/or sections 206. It is to be understood that the arms 200 described herein are exemplary and that any other type or style of articulated or non-articulated arm may be used, including arms that move through telescoping sections instead of through rotating joints.

In some embodiments, perception of surfaces and objects in an environment may be accomplished using touch data, provided by one or more touch sensors 35, 36, and/or using distance data, provided by one or more distance sensors 37. In further embodiments, the robot 100 may build a data structure that represents the positions where it has detected obstacles, e.g. surfaces and objects using touch data and/or distance data. This data structure may be a map of the local environment and is sometimes referred to herein as a "map". One representation of such a map is as a 2 or 3 dimensional array of numbers that indicate likelihood that a particular feature (such as a wall) is in a particular position (represented by the array indices). The map may take on other forms as known to those skilled in the art, such as an array or linked list of non-zero locations in the map.

In some embodiments, a map of the local environment is created for different poses (i.e. position and orientation) of the robot 100. For example, the robot 100 could be in one pose and use touch data received by a touch sensor 35, 36, to map the area reachable by a movable arm 200, and then turn or move to a different pose and map the new area that is reachable by the arm 200. In some embodiments, these maps may be fused together for example by using dead reckoning (such as how far the transportation conveyances 12 (FIG. 1), such as wheels, turned when moving the robot 100) to figure out the approximate relationship between the maps, with fine adjustment of the maps to each other performed by matching overlapping features of the two maps using, for example, a motion estimation algorithm as is well-known to those well-versed in the art of image processing.

In some embodiments, maps may be built using a combination of touch sensors 35, 36, and non-touch sensors such as distance sensors 37. For example, a distance sensor 37 may comprise a 3D laser distance sensor which may be used to provide distance data which may be used to map both far 402 (FIG. 9) and near objects 401 (FIG. 1). Touch data from a touch sensor 35, 36, could be used to map near objects 401, 402. The map of the near objects 401, 402, could include information that is not available to the distance sensor 37, such as the shape of the backside of an object 401, 402, or information about texture, such as where grout or where bits of raised dirt are. Conversely the distance sensor 37 could provide data not available through touch, such as the position of features that are beyond the reach of the touch sensor 35, 36, or data on features that have not yet been touched. In some embodiments, the features from the data provided from the touch and non-touch sensors are placed on separate maps which are then treated as one fused map through a combination of knowledge of the positional calibration between the touch 35, 36, and non-touch 37 sensors and/or by aligning the maps based on features that appear on both maps. In particular, rough fusing can occur through the knowledge of the positional calibration of the touch 35, 36, and non-touch 37 sensors, with fine adjustment of the relative positions of the maps occurring through matching features that appear on both maps.

In some embodiments, touch 35, 36, and non-touch 37 sensors may directly place their data on the same map. In some embodiments, data that come from touch 35, 36, and non-touch 37 sensors may be tagged as touch based and non-touch based, respectively. For example, data from a touch-based sensor 35, 36, may be tagged as being touch-based data and data from a non-touch based distance sensor 37 may be tagged as being non-touch based data.

In further embodiments, the position and pose of the robot 100 may be determined by touching the objects 401, 402, around it to obtain touch data using touch sensors 35, 36. The position and structure of the objects 401, 402, may be simultaneously determined as the touch data is obtained. This may be done using techniques known to those versed in the art such as Bayesian inference. Bayesian inference can be implemented through genetic algorithms (such as a particle filter) or explicitly-defined predictive modeling (such as Kalman filtering). Distance or non-touch based data and data from touch sensors 35, 36, or touch based data may be fused into a single data model with Bayesian inferences using the statistical expectation of their accuracy and precision to combine them. In other embodiments, the touch based data and non-touch based data may be fused using any other type of statistical inference such as frequency inferences, propensity inferences, or state-of-belief inferences.

Use of particle filters and other genetic algorithms to map a two or three dimensional space for the purpose of navigation may be referred to as SLAM, which stands for Simultaneous Localization and Mapping. Some SLAM implementations use a rotating laser distance sensor that reads a continuous stream of distances in various directions. SLAM can also be applied using data from distance sensors 37 such as 3D depth sensors or feature classification of RGB video.

In some embodiments, of robotic touch perception described herein, a particle filter may be used to generate a statistical likelihood model of the position and the orientation of the robot 100. In the art the combination of position and orientation is called a "pose". When using a particle filter a guess as to the pose of the robot 100, such as the pose of the body 11 or arm 200, is called a "particle". For each of these particles the distance sensor 37 distance data or proximity data are graphed on a map. Particles for which successive distance data are consistent with the map are deemed to be more likely to be correct so a probability counter is increased, while those that show inconsistent data are deemed less likely to be correct so a probability counter is decreased. When the probability counter is below a cut-off value the particle is deemed to be confirmed incorrect and replaced with a new particle. At the same time, positions that the distance data most often identified as unchanging in the environment, such as walls and stationary objects 401, 402, (which from now on we will refer to as obstacles) are deemed to be more likely to be actual obstacles so a probability counter associated with having an obstacle in that position is increased, whereas positions that don't consistently have distance readings land on them are deemed to be less likely obstacle positions so the probability counter associated with having an obstacle in that position is decreased.

Very quickly a fairly good map of the environment comprising obstacles emerges as well as a very good guess as to the pose of the robot 100. The resulting map of obstacles along with the most likely pose may be used to navigate the robot 100 through its environment. All of this is existing art and is well-known to anyone in the field. Mathematicians would describe this general type of problem as inferring the solution to two problems simultaneously— in this case the location of the obstacles and the pose of the robot. Mathematicians would refer to the class of solution that the particle filter belongs to as an Expectation-Maximization (EM) algorithm. There are other techniques that fall in the general category of EM algorithms that may equally be used to solve this class of problems, such as Kalman Filters. Further, there may be other Bayesian inference techniques that may be used as well. The following descriptions are based on particle filters, but those skilled in the art will recognize that any other EM algorithm, Bayesian inference algorithm, or any other technique that can solve two or more probabilistic problems simultaneously may equivalently be used.

The problems that must be solved by a robot comprising a movable arm are more complicated than the simple navigation problem. If such a robot is mobile it may use a distance sensor 37 and standard SLAM to determine its pose and the location of walls and obstacles. However, such a robot may also build a map of locations of obstacles (e.g. walls and objects) within 3D space. A 3D map described as discrete grid locations may be referred to as a voxel map in which the elements of such a map are voxels. Other representations of 3D maps are known to those in the art. For example, a collection of non-discrete coordinates is known as a point cloud, with each coordinate element being a point. Another 3D map format is a collection of polygonal surfaces defined using a unit normal vector and a collection vertices as a surface map. Various forms of mapping can also add additional information to each element in the collection such as statistical confidence and the last observed time. For the purpose of illustration the following discussion will be based on a voxel map, but those skilled in the art will recognize that the discussion could instead be mapped to any representation of a map, such as a point cloud, surface map, or other map representation which has not been discussed.

A map may include characteristics of the obstacles, such as whether they move when pressed on. In some embodiments, a map may be created with distance data captured by a distance sensor 37, such as a depth camera, which is mapped onto a three dimensional map data structure. In further embodiments, the pose of the distance sensor 37 may be determined through another means, for example through standard 2D SLAM techniques. One or more EM algorithms may be applied to the distance data from the distance sensor 37. For example, if the EM algorithms are implemented as particle filters, for each data point captured by a distance sensor 37, a likelihood counter for the corresponding voxel or other map element in the two or three dimensional map data structure is incremented. Simultaneously the likelihood counter for voxels or other map element that are in the path of the distance sensor 37 but not read as a surface by the distance sensor 37 are decreased.

In preferred embodiments, a distance data measurement device distance sensor 37, such as a depth camera, may be mounted on a movable arm 200 that is in turn mounted or coupled to a mobile body 11 of a robot 100 as shown in FIG. 1. In further embodiments, standard SLAM techniques may be used to determine the pose of the body 11, and the measured position of joints 201 on the arm 200, such as by using rotary encoders that measure the position of each joint 201, may be used to determine the pose of the elements of the arm 200 relative to the body 11. The pose of the body 11 may be mathematically combined with the pose of the arm 200 relative to the body 11 to determine the pose of the arm 200 relative to the overall environment.

In some embodiments the pose of the arm 200 relative to the body 11 may be determined using a technique known as visual servoing, wherein a unique visual mark known as a fudicial is placed on the arm 200 and tracked by a camera.

In some embodiments, a map of the environment and pose of the arm 200 may be determined using an EM algorithm. In further embodiments, a particle filter may be used to create the map and determine the pose of the arm 200. For example, particles may be created for likely positions of the arm 200. One or more tuples of distance to nearest obstacle and direction may be measured, for example by using a depth camera distance sensor 37 to determine distance to nearest obstacle in many directions at once or by using a distance sensor 37 to determine distance to the nearest obstacle in a single direction. Each combination of tuple and particle may be compared to a 3D map of probabilities of position of nearest obstacle. A measure of particle likelihood may be increased if the combination of tuple and particle indicates a position that is likely to be a position of nearest obstacle, and decreased if the combination of tuple and particle point to a position that is unlikely to be a position of nearest obstacle. The increase or decrease may be proportional to the likelihood. The probability of a given voxel or other map element being the position of nearest obstacle is increased proportionally to the number of combinations of tuple and particles that indicate it is a voxel or other map element that is the position of the nearest obstacle. Voxels or other map elements that have no tuple and particle combinations indicating that it is the position of the nearest obstacle may have their probability measure decreased. Particles that are deemed to be very unlikely may be replaced with particles that have a pose that are deemed to be more likely. These steps may be repeated over and over again, in a preferential embodiment once per distance sensor 37 reading. The pose of the robotic arm 200 may be deemed to be that of the particle with the highest likelihood measure. In some embodiments, the particle probability is reported to higher levels of the software. In other embodiments, techniques other than particle filters may be used and be functionally equivalent.

In some embodiments decisions may be made according to the probability of correctness of the highest likelihood particle for pose of the robot 100 and/or arm 200. This decision could include one or more of the following: decision as to whether to continue a first operation (such as wiping) or to perform a second operation (such as calibration) after which the first operation is returned to; a decision as to whether to pause to allow particle likelihoods to settle due to continued sensor readings allowing refinement of the map; and/or a decision to abandon current operation because position determination is uncertain.

For standard 2D SLAM the selection of initial and replacement particles may be accomplished by a suitable methodology. For example, if the position of the robot 100 is thought to be known, particles are chosen for robot 100 position and orientation that are the same and almost the same as the robot 100 had in the most recent scan, as well as particles for positions and orientations that are predicted for the current SLAM, e.g. by applying the motion vector expected by the turning of the robot's drive wheels or other transportation conveyances 12. If the robot 100 position is not known, typically particles are created for some number of random positions and orientations within the possible space.

In some embodiments, a method of determining the three dimensional pose of the arm 200 may include creating particles that represent the position of the arm 200 based on the springiness or resilience of the arm 200, such as by calculating approximations of possible positions of the end of the arm 200 if it is bouncing up and down and/or side to side due to lack of rigidity, optionally based on a physics-based mathematical model of the robot arm In some embodiments, a method of determining the three dimensional pose of the arm 200 may include creating particles based on the end of the arm 200 getting stuck. For example, the arm 200 may be commanded to move but the portions of the arm may be unable to move, so the robot body 11 may be moved e.g. by rotating.

In some embodiments, distance measurements are performed using touch based data provided by one or more touch sensors 35, 36. One or more touch sensors 35, 36, may be are located anywhere on the robot 100, such as anywhere along the arm 200 and/or body 11. A touch sensor 35, 36, may be any sensor that detects close proximity or mechanical contact between parts of the robot 100 and its environment. This is understood to also include sensors that indirectly detect touch, proximity, and/or contact by measuring the consequence of touch, such as a sound sensor that detects the sound of a robotic arm 200 hitting a surface, or an accelerometer whose data can be examined for acceleration spikes that are indicative of contact with a surface, or a pressure or strain gauge that would have a similar spike in its reported data when contacting a surface. Touch sensors 35, 36, may also include but are not limited to capacitive touch sensors, pressure sensors (such as Force-Sensitive Resistors and load cells), and/or short-range binary proximity sensors, such as the commonly-available optical proximity sensors.

In embodiments, a map of the environment and pose of the arm 200 and/or body 11 may be determined using touch data provided by one or more touch sensors 35, 36. For example, particles may be created for likely positions of the arm 200. Expected direction of motion for each touch sensor 35, 36, may be calculated based on arm motor 34 velocity for each of the arm joints 201 and/or on the body motor 33 velocity for the body 11 transportation conveyances such as drive wheels. The expected direction of motion may be combined with a binary measure of whether or not the touch sensor 35, 36, is detecting touch with an object 401, 402. This direction and the binary measure may be combined into a tuple, which may be used in exactly the same manner as described earlier for distance-sensor based tuples.

In some embodiments, tuples based on touch sensor 35, 36, data and tuples based on distance sensor 37 distance data may be processed using the same 3D obstacle probability map. In further embodiments, tuples may be assigned reliability score based on multiple factors. For example, touch data from one or more touch sensor 35, 36, may be deemed to be more accurate and reliable than distance data provided by one or more distance sensors 37. In such a case the touch data tuples may increment probabilities at a factor that is scaled up from the probability increments from distance data tuples, for example each touch tuple may affect probabilities on the map with twice the change the distance data tuples. The probability scaling factor may be different based on different circumstances. Such circumstances may include position of sensor 35, 36, 37. For example, a touch sensor 35, 36, on the body 11 could have a very high probability scaling factor because its position is well known, whereas a touch sensor 35, 36, on the end of an arm 200 could have a lower probability scaling factor because its position is more uncertain. Such circumstances may also include position of robotic arm 200. For example, if the robotic arm 200 has more accurate detection of its position when in a folded position than when in an extended position the probability scaling factor could be changed accordingly based on the position of the arm 200.

In preferred embodiments, one or more of the following exemplary sensor configurations may contribute to a single 3D obstacle probability map of the environment, with desired probability scaling factors: a depth camera distance sensor 37 mounted on the robotic arm 200; a set of arm touch sensors 36 mounted to the end of the robotic arm 200 that measure pressure applied to an accessory 300, such as a cleaning pad or other surface interface, mounted to an accessory mount 221; a set of arm touch sensors 36 along the arm 200, including one at one or more joints 201; a set of body touch sensors 35 on the periphery of the body 11; and/or a binary sensor that detects a drop off of the floor, such as would occur at a flight of stairs.

In some embodiments the robot is moving the end of its arm across a surface, for example to wipe a surface. In further embodiments, a pressure sensor 35, 36, may be multi-dimensional and may be used to measure the pressure during the movement. A multi-dimensional pressure sensor 35, 36, could detect pressure in one or more of the following directions which for illustrative purposes are described relative to a wiping pad that has pressure applied normal to a surface. For example, a multi-dimensional pressure sensor 35, 36, could be coupled to an accessory mount 221 to which an accessory 300 such as a cleaning or polishing pad may be attached. The multi-dimensional pressure sensor 35, 36, may then detect pressures such as normal pressure to the top or bottom of the pad, normal pressure to the left side or right side of the pad, pressure to rotate the pad to the left or the right, pressure parallel to the upper or lower edge of the pad, pressure parallel to the left or right edge of the pad.

In some embodiments, a control loop may be used to control pressure of the end of the arm 200 as it moves across a surface. Any type of control loop may be utilized. A common type of control loop for physically-actuated systems is known as a PID loop for Proportional, Integral, and Derivative, however there are many other kinds of control loops that may be used equally well. In further embodiments, the robot 100 is configured to move an accessory 300, such as a flat pad, other flat object, or rotating scrub brush, which may be secured to an accessory mount 221 on an arm 200 and which may be normal to an object with compound curves by using a control loop such as a PID loop using a set of touch sensors 36, such as those detecting pressure normal to the top/bottom and left/right of the pad. In preferred embodiments, a pad may have three touch sensor inputs that detect pressure normal to the pad. These three sensors may form a triangle. Through simple arithmetic these three sensors 36 can be used to calculate pressure normal to the upper part of the pad, the lower part of the pad, the left part of the pad, and the right part of the pad.

In a control loop, such as that discussed above, an error (desired value minus actual value) is calculated which a controller attempts to minimize by changing the state or position of an active element, such as a motor 33, 34. In the control loop described above the error is the desired pressure minus the actual pressure in each of the directions and the controller controls the motors to minimize this error. In some embodiments a control loop error may be used as a touch sensor reading. For example, a control loop error that shows expected or high pressure represents a reading that indicates the surface is being touched, while an error that indicates pressure a specified amount below target pressure (such as zero pressure) represents a reading that indicates the surface is not being touched. In other embodiments, touch data may come from one or more of the following: error readings from control loops used for wiping a pad or probe, touch data from touches that are explicitly made for the purpose of determining where obstacles are; incidental and unexpected positive touches, such as the arm 200 indicating touch when it was expected not to; lack of touch when touch was expected, such as the arm 200 not detecting touch when it is thought that it has been moved into position touching a surface such as a table.

In some embodiments the 3D map includes both probabilities of a location containing an obstacle, as well as other visual information, which could include but is not limited to: brightness, saturation, and/or hue (as would be measured directly by a distance sensor 37 such as camera); transparency (e.g. change in brightness, saturation, and/or hue when light is shined behind the object, either directly, or by bouncing light off of a surface or object behind the object); and/or variation (e.g. standard deviation of measured brightness, saturation and/or hue from reading to reading).

In some embodiments a 3D map of touch data characteristics may be created. This map could include whether the surface moved when touched, optionally along with how much force was required, optionally along with whether the surface returned to the original spot when pressure was released. Such detection could be performed using the following steps: move a robotic arm 200 with a pressure sensor 36 attached towards surface until pressure is first detected; attempt to move the robotic arm 200 further in the same direction until either a specified maximum allowable pressure is reach or a specified maximum allowable displacement is reached; return the robotic arm 200 to the position of first pressure detection, measuring the position of the robotic arm 200 where pressure falls to zero. Those skilled in the art will recognize that there are other sequences of motion of the robotic arm 200 that will yield similar results and are functionally identical to this sequence.

In some embodiments, a 3D map of touch data characteristics such as surface texture detection. Such detection could be performed using the following steps: move a probe or pad accessory 300 across a surface with a constant force normal to the surface; measure the lateral force required to move the pad or probe; optionally, repeat the process with a different normal force. The lateral force may be proportional to the roughness of the surface, with smooth surfaces requiring little lateral force to move the pad or probe, whereas rough surfaces may require more lateral force. The shape of the probe may be chosen to exclude roughness caused by small features. If the probe is a sphere, small spheres may detect roughness including both small and large features. Larger spherical probes may exclude roughness due to features that are substantially smaller than the radius of the sphere. Various probe shapes may be chosen. Symmetrical shapes such as a sphere will detect horizontal and vertical roughness equally, whereas a non-symmetrical shape such as a rectangle with a rounded edge may preferentially detect roughness in a single direction. Such a probe could be useful for detecting roughness due to e.g. grout lines in bathroom tile.

In some embodiments the 3D map of touch data characteristics is used together with either or both of the 3D map of probabilities of obstacle and/or the 3D map of visual characteristics. In some embodiments a 3D map of places where the arm 200 got stuck or was unable to move is created. This may be a 3D voxel map which may be combined with one or more of the previously described 3D maps.

In some embodiments, changes in surface material or different types of material may be detected by touch sensors 35, 36, and special cleaning algorithms that also utilize touch may be applied. For clarity the example presented below talks of grout, but other changes in surface material apply equally well, such as caulk, mortar in bricks, etc. For the purpose of this explanation, an area which has surface dirt that makes an otherwise smooth surface feel rough, such as dirty tiles, may be considered a change in surface material (dirty tile versus clean) for the purposes of this description. In preferred embodiments, the algorithm may comprise a robot performing moving a probe across the surface of interest. The probe may comprise an object that has a shape that would cause it to "catch" on one of the materials, for example grout, by providing a change in resistance when it moves from the surface of e.g. a tile to grout. An example of such a shape would be a rod with a hemispherical end, which would descend into a grout line if moved across the surface of tiles that are separated by grout. Another example of such a shape is a bristled brush, which would provide more resistance to lateral motion on a rough surface than exists on a smooth surface. A constant pressure normal to the surface may be maintained. When a surface change (e.g. a grout line) is crossed, the force required to move across the surface will change, and will then return to its original value when back on the first material (e.g. tile).

In some embodiments, the probe may be moved across the surface in two or more directions of travel. The position where force begins to change is likely to be after the beginning of the change in material (e.g. grout), and the position where the force begins to return to the previous value is likely to be after the end of the change in material (e.g. grout). The force curves for the different directions versus position may be combined using a physics-based model that takes into account probe shape, shape of the area where material changes (e.g. that tile is proud of grout), and/or material properties (e.g. that grout is rougher and therefore requires more force to move a probe across it). By running two or more directions over the change in material (e.g. grout) the actual position of the grout may be determined more accurately.

In some embodiments, a visual system may be used help identify material change (e.g. grout) position. Material change position detected by change in force may be compared to edge detection data from the visual system, and if an edge is present the visual system edge may be used to correct the material change (e.g. grout) position. In some embodiments, lines (e.g. straight lines) may be fitted to the visual data and/or probe-based data using standard curve-fitting techniques known to those versed in the art of mathematics. In further embodiments, a map of the material changes (e.g. grout lines) may be made.

In some embodiments, a secondary material that sits below the surface of the primary material (for example grout sitting below the surface of tile) may be cleaned. In preferred embodiments, this cleaning may be performed by an accessory 300 which may function as a probe, such as a cleaning pad, cloth, rotating brush, or other cleaning device that may be attached to a robot 100 such as to the distal end 212 of an arm 200. In some embodiments the edge of the cleaning pad, cloth, rotating brush, or other cleaning device may be turned to get into the well or depression that the secondary material forms. In further embodiments, a back and forth scrubbing motion may be performed. In still further embodiments, a pad or cloth has vibration applied to it to improve cleaning. In further embodiments, the secondary material (e.g. grout) may be cleaned with a rotating brush.

Figure 5:
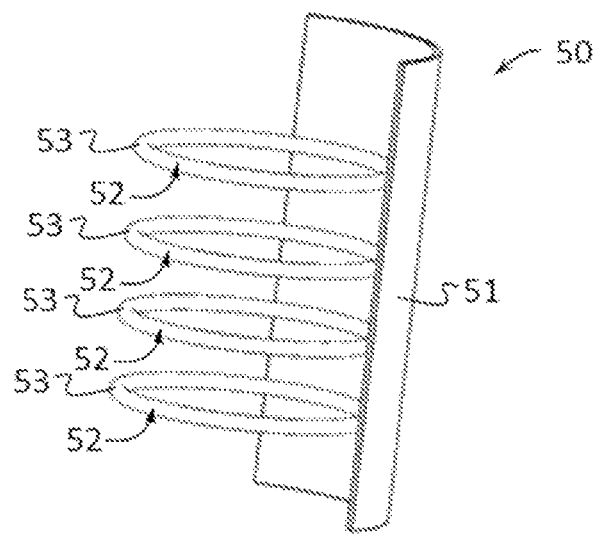
FIG. 5 illustrates a perspective view of an example of a touch sensor comprising electromechanical skin according to various embodiments described herein.

FIG. 5 depicts a perspective view of an example of a touch sensor comprising electromechanical skin assembly 50 according to various embodiments described herein. In some embodiments, collision between the robot 100 and other things (including but not limited to objects, walls, and elements of the robot 100 itself) may be detected through a flexible pressure sensitive electromechanical skin assembly 50. Such a skin assembly 50 may be constructed with an electrically conductive skin material 51, such as an electrically conductive silicone or rubber, stretched so that it is just proud of a conductive surface 52 as an example. In some embodiments, the conductive surface 52 of the skin assembly 50 may be formed by stretched strings 53 of conductive material, for example conductive rubber in the shape of rubber bands. The geometry may be designed such that deformation of the skin material 51 results in touching the conductive surface 52, completing an electrical circuit. Detecting the position of deformation could be accomplished by segmenting either conductive skin (e.g. by having alternating strips of conductive and non-conductive material) or by segmenting the conductive surface. If the skin 51 is segmented in one direction (for example vertically) and the conductive surface 52 may be segmented in another direction (for example horizontally) then full position information of where the deformation will be available. Amount of force or area related to the deformation may be detected by having conductive skin material 51 that has resistance at the contact point, so that the resistance of the connection would indicate how much skin material 51 is touching the conductive surface 52.

In some embodiments, an electromechanical skin assembly 50 configured to provide touch data may also be constructed by sending an AC signal through the skin 51 that is a frequency that would resonantly couple with maximum efficiency with the underlying surface at a particular distance. In this case full contact between the two surfaces 51, 52, is not required, as the amount of coupling is determined by the distance of the two surfaces 51, 52, from each other, which in turn is affected by the pressure that the skin assembly 50 has applied to it.

Figure 6:
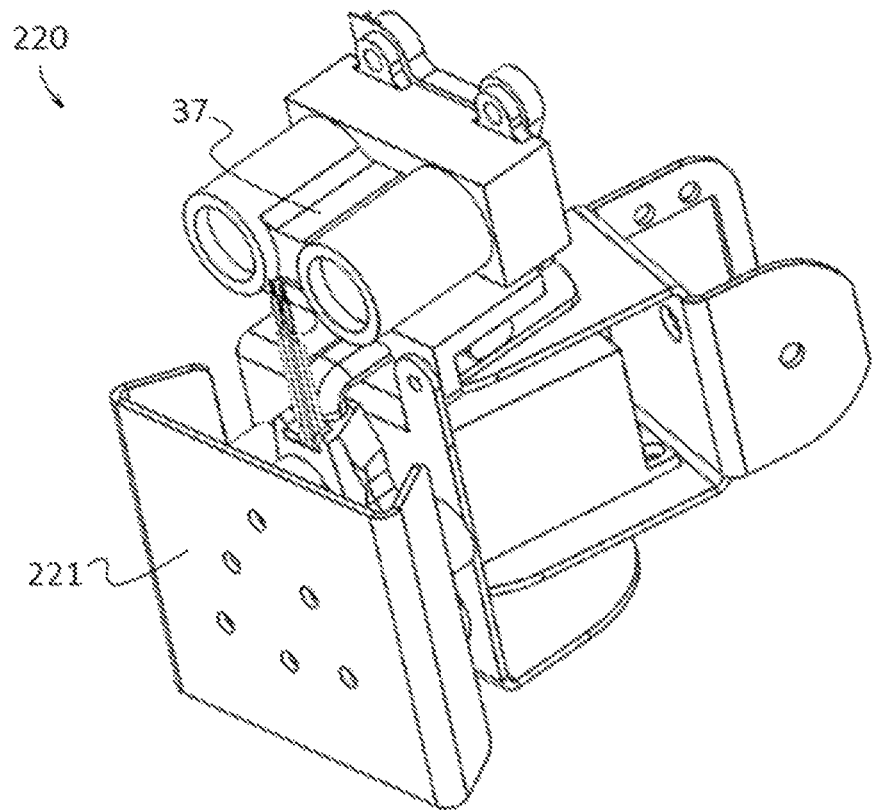
FIG. 6 shows a perspective view of an example of an effector suite which may be coupled to a movable arm according to various embodiments described herein.
Figure 7:
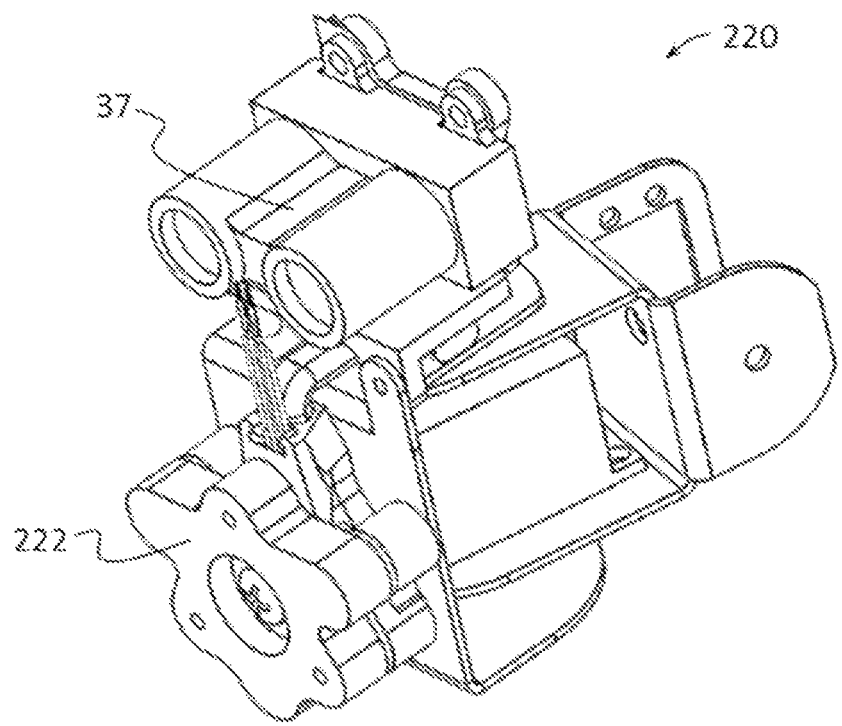
FIG. 7 depicts a perspective view of the effector suite of FIG. 6 with the exemplary accessory mount removed according to various embodiments described herein.
Figure 8:
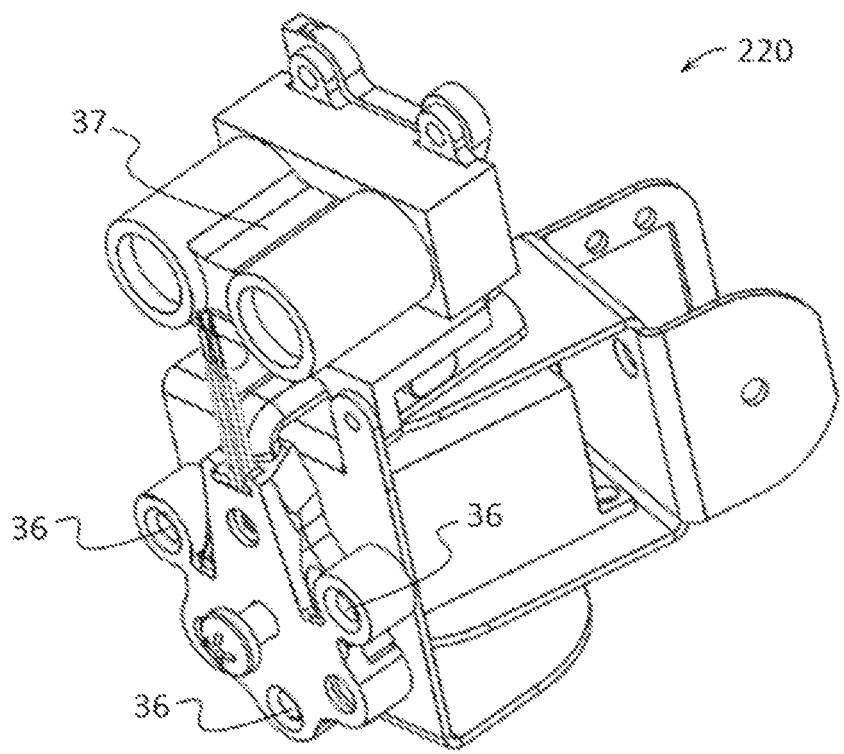
FIG. 8 illustrates a perspective view of the effector suite of FIG. 6 with the exemplary accessory mount and the exemplary touch sensor cover removed according to various embodiments described herein.

Turning now to FIGS. 1, 6-8, in preferred embodiments, a robot 100 may be configured to move an accessory 300, such as a flat pad, other flat object, or rotating scrub brush, which may be secured to an effector suite 220 as shown in FIG. 1. An effector suite 220 may be coupled to the arm 200, such as to the distal end 212, and may be configured to secure an accessory 300. In some embodiments and as shown in FIGS. 6-8, an effector suite 220 may comprise one or more arm touch sensors 36, distance sensors 37, and/or accessory mounts 221. Generally, an accessory mount 221 may be configured to couple an accessory 300 to the effector suite 220 with the accessory 300 typically configured to contact or interact with objects 401, 402, and surfaces in the environment. For example, an accessory mount 221 may be configured to secure a cleaning pad accessory 300 as shown in FIG. 1 which may be moved to contact or wipe the surface of an object 401.

Accessory mounts 221 may be configured in a plurality of shapes and sizes to allow a plurality of types of accessories 300, such as pads, brushes, probes, air jets, water jets, buffing pads, polishing brushes, grout cleaning brushes or pads, grasping or gripping devices, or any other type of accessory which may be moved into contact with an object 401, 402. In preferred embodiments, an accessory 300 may be moved into contact with an object 401, 402, by the robot 100 and/or arm 200 to allow the robot to complete a goal directed action such as cleaning, polishing, drying, washing, buffing, sanding, dusting, painting, or any other type of action or activity. For example, a cleaning brush accessory 300 may be secured to the accessory mount 221 of an effector suite 220 which is coupled to the distal end 212 of an arm 200 of a robot 100. The robot 100 may move into proximity of an object 401, 402, and then move the arm 200 to rub the cleaning brush across the object, thereby completing the goal directed action of cleaning a portion of the object 401, 402.

In preferred embodiments, an accessory mount 221 may be coupled to an arm touch sensor 36 and configured to receive touch data when the accessory mount 221 and/or an accessory 300 secured to the accessory mount 221 is moved into contact with an object 401, 402, or surface. For example, an accessory mount 221 (FIG. 6) may be coupled to a touch sensor cover 222 (FIG. 7) which is configured to shield or cover one or more, such as three, arm touch sensors 36. These three sensors 36 may be positioned in a generally triangular shape as shown in FIG. 8 and through simple arithmetic these three sensors 36 can be used to calculate pressure normal to the upper part, lower part, the left part, and the right part of the mount 221 and/or an accessory 300 secured to the accessory mount 221 is moved into contact with an object 401, 402, or surface. In other embodiments, an effector suite 220 may comprise three touch sensors 36 positioned in a generally triangular shape which may be formed by three force sensitive resistors and a touch sensor cover 222 which may have three protrusions which are each positioned to contact a force sensitive resistor. An accessory mount 221 may be coupled to the touch sensor cover 222 thereby allowing the touch sensor 36 to receive touch data when an accessory 300 secured to the accessory mount 221 contacts an object 401, 402, thereby causing one or more protrusions on the cover 222 to interact with one or more force sensitive resistors.

Figure 9:
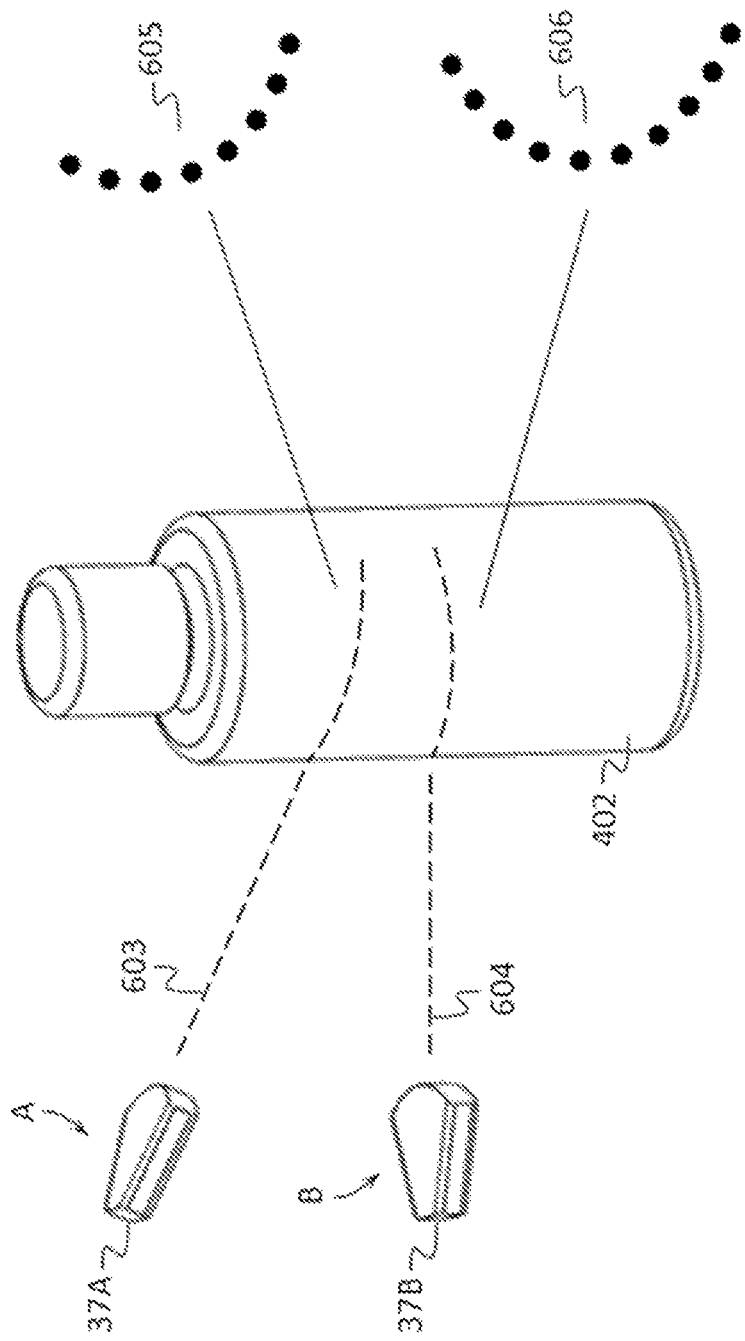
FIG. 9 shows two example scans of an object using discrete two dimensional scanners whose scans may be used for mapping of an environment according to various embodiments described herein.

FIG. 9 illustrates two example scans of an object using discrete two dimensional distance sensor 37 whose scans may be used for mapping of an environment according to various embodiments described herein. In some embodiments, the scans may be made by one or more distance sensor 37 which may be positioned on an effector suite 220 (FIGS. 1, 6-8) or positioned anywhere on a robot 100. Example cases of a scan from the side or from a different angle are shown in FIG. 9. FIG. 9 shows two example scans of a generally cylindrical object 402 which may be made using discrete two dimensional distance sensors 37A, 37B or made by moving a single distance sensor 37 into two different positions A,B, and whose scans follow the path 603 and 604 respectively, resulting in discrete scan readings or distance data approximating an ellipse 605 for sensor 37A in position A and a circle 606 for sensor 37B in position B according to various embodiments described herein. In this embodiment the position points along an object 402 could be compared to the values that would be generated by the combination of primitive shapes in each library entry utilizing the range of possible parameter values specified in the library entry, searching a database in a data store 308 (FIG. 11) to see if there is a set of parametric values that yield an error (such as mean squared error) below a threshold value. Parametric values may include zero or more of size, diameter, size or shape of a fillet, etc. The threshold value may either be an absolute number, or may be scaled according to relevant factors, such as the size of the object, or how much variation that type of object 402 might have (for example a particular size lego brick is manufactured to close tolerances, whereas a bar of soap may be a large variety of different sizes). Choosing parameter values could use techniques that are well-known in the art for finding global minima, such as random seed starting points followed by a directed search for minima starting from that seed.

Figure 12:
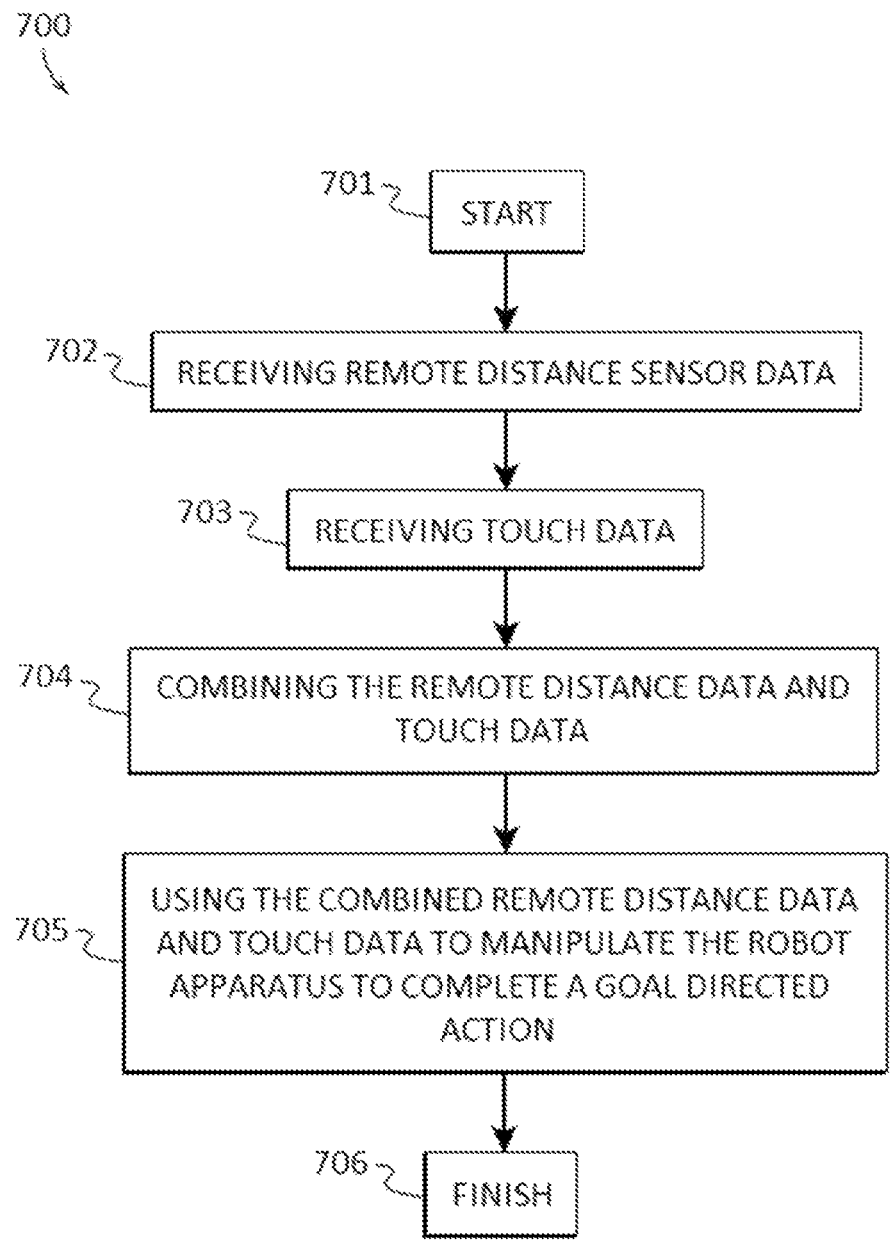
FIG. 12 shows a block diagram of an example of a method for combining sensor data to perform a goal directed action according to various embodiments described herein.

In some embodiments, multiple parallel scans of the same space may be made, for example horizontally at heights of 1 inch, 3 inches, and 5 inches from a reference point, such as the largest flat surface to provide distance data for use with a library of objects 502 (FIG. 12). Optionally, the library 502 may contain the expected values of all three scans in alignment. In some embodiments, the expected values of one or more perpendicular scans may be included in the library 502. In this embodiment scans may be made in one direction, yielding a set of object candidate matches by comparing the scan data against the library data. The matches may be ruled in or out according to how well they match when a perpendicular scan is performed.

FIG. 12 shows a block diagram of an example of an object library 502 database of data associated with objects 401, 402, according to various embodiments described herein. In some embodiments, a library of objects and/or surface shapes 502 exists. The library 502 may include a data record 501 for one or more, and preferably for each object 401, 402, that has been or may be encountered in an environment. The library 502 may be in the form of a database which may be stored in a data store 308 accessible to the processing unit 21 of the robot 100. Optionally, the data store 308 may be locally accessible to the processing unit 21 and/or remotely accessible such as a cloud based data store 308 accessible through the radio 23 or other network interface. Each data record 501 may comprise one or more data fields or categories, such as a name category 511, a shape data category 512, a parameters that may change category 513, an attributes category 514, a reaction to stimuli category 515, a center of gravity category 516, a grasping category 517, a cleaning category 518, an attachment category 519, and/or any other category or data field which may receive or store data associated with an object 401, 402.

Scans of objects 401 (FIG. 1), 402 (FIG. 9), (through touch, 3D range-finding, or other 3D detection techniques) may be matched to object data records 501 within the library 502. The library 502, shown in exemplary form in FIG. 10, may contain additional information about the objects 401, 402, for example whether they are fixed (like a faucet handle) or movable (like a shampoo bottle) which may be stored in a attributes category 514, what material they are made of which may be stored in category 514, the motions necessary to traverse the surface, for example for cleaning, how to grasp for moving the object 401,402, etc which may be stored in categories 515-518. The library 502 may also include information about the object 401,402, that represents the object's reaction to stimulus which may be stored in category 515, such as whether it moved when a force was applied to the top, or characteristics that required both interaction and calculation to determine, such as the center of gravity of the object 401,402, which may be stored in category 516 or how full a shampoo bottle is.

There are a number of ways that objects 401,402, may be matched to objects in the library 502. In some embodiments, objects 401,402, may be matched to object data records 501 in the library 502 as an exact match. The library 502 would include a set of data in a data record 501 that represents each object's shape, and position points along the unknown object 401,402, would be compared with the library of shapes with some error allowed. For example the position points along the unknown object 401,402, could be compared to the shape categories 512 in the library 502, and a least mean square error generated between the position points along the unknown object 401,402, and the shape in the library 502, with a match declared to the library shape with the lowest least mean square error as long as the error is below a threshold.

In some embodiments, objects 401,402, may be matched to data records 501 of objects in the library 502 as parametrically as a combination of primitive shapes. The primitive shapes could include but are not limited to cylinders, cones, rectilinear volumes with or without rounded corners. For example the library 502 could determine that a set of position points along an object 401,402, that is consistent with being cylindrical is a bottle. Or it could be more specific—any object 401,402, that has a lower portion that is consistent with being cylindrical with a diameter of 2 to 5 inches, and an upper portion that is consistent with being cylindrical with a smaller diameter is a shampoo bottle. When we speak of "consistent with being cylindrical" we refer to distance sensor data or touch sensor data from above that shows an object 401,402, that is circular when viewed from above, and/or a scan or touch from the side that shows a half cylinder (the other half being obscured by the front of the object) and/or a scan or touch from a different angle that shows an ellipse.

In some embodiments, objects 401, 402, may be matched to data records 501 of objects in the library 502 as functionally. A set of rules would be considered that form a decision tree for the type of object 401, 402. For example objects 401, 402, that touch a horizontal surface are assumed to be standalone objects like shampoo bottles, and objects 401, 402, that do not touch a horizontal surface are assumed to be fixed objects, like a faucet handle.

In some embodiments, a set of parameters may be stored with the data records 501 of objects in the library 502, representing the range of different versions of the object 401, 402. For example, the position points that a rectangular object 401, 402, would generate could be in the library 502, along with a parameter that describes what the allowable range of rotation that the object might have (for example, a cylindrical object would have a single rotation tested, since rotation doesn't matter, whereas a square object could be tested for rotation every 5 degrees across 90 degrees of rotation, optionally with rotations of greater than 90 degrees ignored since they would be identical to rotations of less than 90 degrees. In a further example, the position points that a rectangular object 401, 402, would generate could be in the library 502, along with a parameter that describes what the allowable range of scaling would be. For example an object 401, 402, that is only available in a single size (such as a shot glass) may have a parameter that would indicate that only comparisons to the reference points at 1x scaling should be tested, whereas an object 401, 402, that is available in a number of sizes, such as a shampoo bottle or wine bottle might have a parameter indicating that is could be tested for sizes from for example 0.5x to 3x.

In some embodiments, objects 401, 402, may be tested for being fixed or moveable by pushing on them a very short distance (such as 0.25 inches). If they provide resistance they are fixed, if they move they are movable objects. The objects' expected response to, for example, being pushed on could be included in the library 502 and used as one of the parameters 514 for object matching.

In some embodiments, the orientation of a distance data or touch data may be corrected by assuming that straight surfaces that are close to horizontal are exactly horizontal and by assuming that straight surfaces that are close to vertical are exactly vertical. Since objects with horizontal and/or vertical features are very common, this may reduce the computing complexity necessary to match objects 401, 402, to corresponding objects in the library 502 in many cases.

In some embodiments, motions to interact with an object 401, 402, may be included in the library 502. For example for a cleaning application if a surface must be sprayed and wiped, spraying and wiping could be a predetermined set of actions for each library data record 501 or parametric shape. In the same cleaning application, it is possible that some objects 401, 402, may be meant to be skipped (like a bar of soap) or moved out of the way (like a shampoo bottle). Instructions for these other interactions could be included in the library 502, including if appropriate a set of parameters for the action or the exact poses needed to perform the action.

In some embodiments, objects' 401, 402, shapes may be measured, e.g. using touch sensor data or touch perception and/or a camera and/or a distance sensor 37, either one by one or as a group. In some embodiments, object 401, 402, shapes may be measured before and/or after being manipulated, such as being grasped and/or lifted. In some embodiments, objects' 401, 402, shapes may be matched to shape data for data records 501 of objects in the library 502.

In some embodiments, object 401, 402, shapes may be matched to either a data record 501 of an object in the library 502 or a category 511—519 of objects in the library 502. For example, the library 502 could contain an entry that has parameters that match a particular puzzle piece, but the library 502 may also contain an entry that covers a category, such as puzzle pieces or hard objects below certain dimensions.

In some embodiments, deformable objects 401, 402, such as those made of cloth may be included in the library 502. In one embodiment they are identified by a combination of their shape and by the fact that they are deformable (e.g. they change shape when force is applied). In some embodiments, one object category is that of deformable objects 401, 402.

In some embodiments, the object 401, 402, and object category in a library 502 may include a field that indicates what category the object or object category falls into. The categories may form a data structure, such that an object category (such as puzzle piece) may also belong to another category (such as hard object 401, 402).

In some embodiments, the robot 100 includes a grasper. The grasper will be capable of interfacing with objects 401, 402, for example in order to lift them. The grasper may use zero or more of the following techniques: fingers which hold an object 401, 402, by holding a feature of the object 401, 402, between them; suction; electro-adhesion; other means of adhesion; a needle, or other piercing instrument; an eating utensil, such as a fork or spoon; and/or a special shape that mechanically interfaces with an object 401, 402, e.g. a collar that is the correct shape to accept a mop handle.

In some embodiments, objects 401, 402, may be placed into physical bins by an autonomous machine, or into places that are designated for particular objects or categories of objects.

In some embodiments, a representation of the object 401, 402, (such as a photograph or 3D scan) may be added to the database when an object 401, 402, is encountered, along with information such as where the object 401, 402, was found, and where the object 401, 402, was placed.

In some embodiments, data about the object 401, 402, (such as its weight) may be added to the database when an object 401, 402, is encountered, along with information such as where the object 401, 402, was found, and where the object 401, 402, was placed. In further embodiments data such as weight is used to report to the user information about how much of the contents is remaining, such as warning the owner that they are almost out of milk, and/or taking an action such as ordering more milk. In further embodiments the robot 100 uses an RFID reader to query nearby objects and catalog where RFID-enabled objects are.

In some embodiments, the robot 100 lifts each object 401, 402, optionally one at a time, within an area that is designated as needing de-cluttering. It may take object 401, 402, shape measurements such as with a touch sensor 35, 36, and/or distance sensor 37, which then may be compared to information in the object database, by which means the identity or object category for the object may be determined. It then may place the object 401, 402, in a bin or in another type of location that is designated for that type of object 401, 402.

In some embodiments, some or all objects 401, 402, may be put back where they came from. The database may keep track of where an object 401, 402, was found. In some embodiments, the database may be queried to find information about objects 401, 402, such as what they look like or where they were found, or where they reside now to provide the ability to remotely view an object 401, 402, to see it's state (for example to examine from a remote location a recent photograph of a shampoo bottle in the shower to see if more shampoo needs to be bought). In further embodiments, the database may be queried to find information about objects 401, 402, such as what they look like or where they were found, or where they reside now to provide the ability to find a missing object 401, 402, (for example to find where the missing car keys are). In still further embodiments, the database may be queried to find information about objects 401, 402, such as what they look like or where they were found, or where they reside now to provide the ability to remotely view an object to see the information that is on it (for example to examine a piece of paper that has a password on it)

In some embodiments, the robot 100 can move a group of objects 401, 402, from one place to another, performing an action during the transition. To do this, objects 401, 402, may be scanned to provide touch data and/or distance data and matched to an object data record 501 in the object library 502 as previously disclosed. In one embodiment, one of the either the source or destination (or both) location of the objects 401, 402, is a structured environment that has spaces that may hold particular types of objects 401, 402, and the robot 100 may match the library data records 501 of objects to the spaces that are marked as accommodating said objects 401, 402. For example, a robot 100 may fill a dishwasher by moving objects 401, 402, (e.g. dirty dishes) from a sink, after which the object 401, 402, is rinsed, after which the object 401, 402, is placed into a suitable location in the destination (e.g. the dish is placed into a slot within the dishwasher rack).

In preferred embodiments, a robot 100 may comprise: a grasper; one or more sensors 35, 36, 37; an object library 502, wherein the grasper lifts one object 401, 402, at a time and a set of object shape measurements are taken by a touch sensor 35, 36, and/or distance sensor 37 which are compared to each entry in the object library 502, a best match for the object 401, 402, is determined, and the object 401, 402, is placed into a place that the data record 501 says is the proper place for an object 401, 402, of that type.

In further preferred embodiments, a robot 100 may comprise one or more sensors 35, 36, 37, including one or more touch sensors 35, 36, and a representation of the environment or objects 401, 402, within it such as in a memory or data base 308 accessible to the robot 100, wherein data collected from a touch sensor 35, 36, is added to the representation of the environment or objects within it.

In further preferred embodiments, a robot 100 may comprise one or more sensors 35, 36, 37, including one or more touch sensors 35, 36, wherein information provided by a touch-based sensor 35, 36, is used to map a portion of the environment and/or objects 401, 402,within it.

FIG. 11 illustrates a block diagram illustrating some modules which may function as software rules engines or programs 28 (FIG. 3) and which may be performed in the memory 25 (FIG. 3) of a processing unit 21 (FIG. 3) according to various embodiments described herein. In preferred embodiments, the programs 28 may comprise a mapping module 600 which may include a mapping engine 601, a touch engine 602, a distance engine 603, and/or a fusion engine 604 according to various embodiments described herein. In some embodiments, one or more functions of one or more engines 601-604 may be performed by one or more other engines 601-604.

Figure 10:
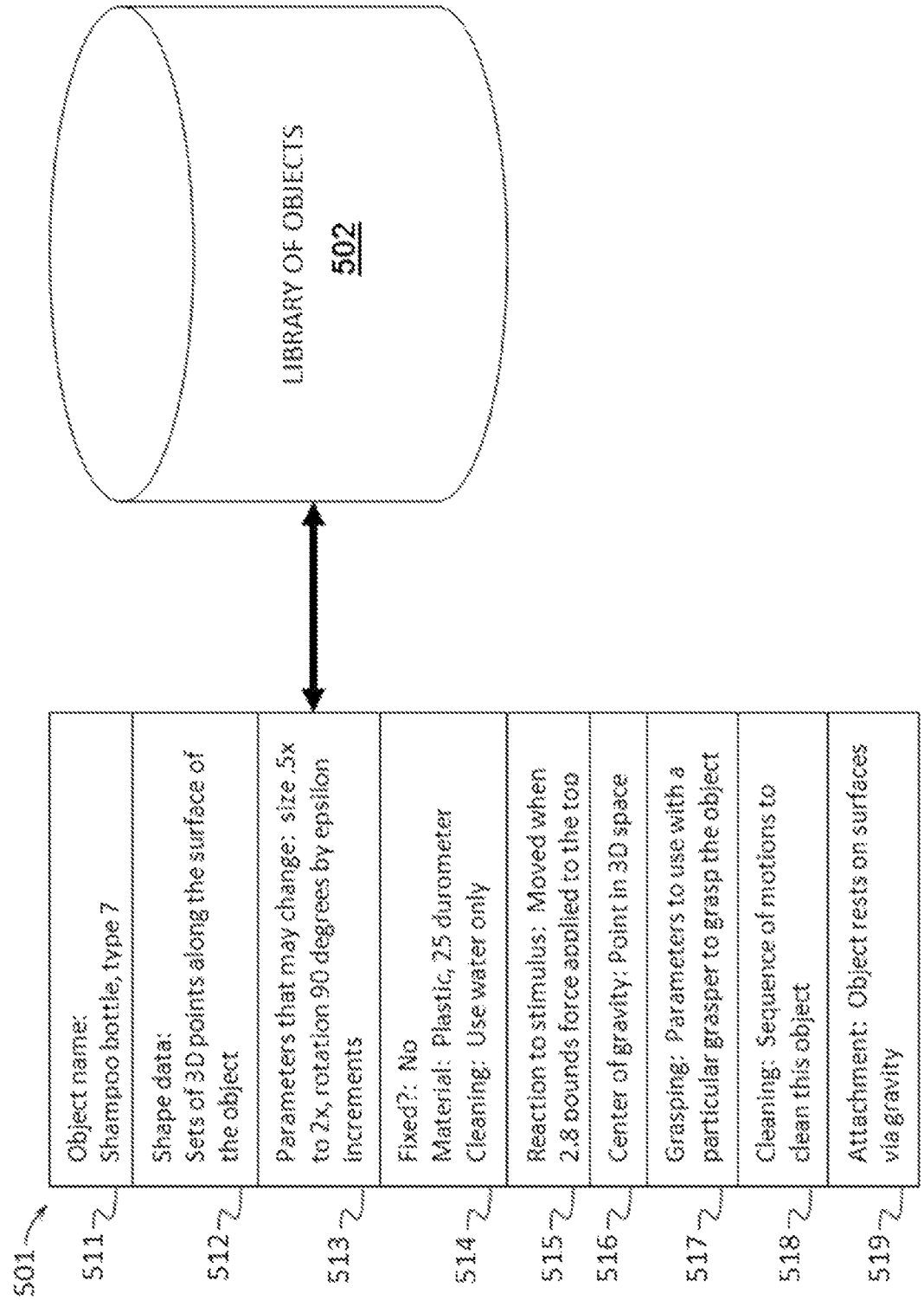
FIG. 10 depicts a block diagram of an example of an object library of data objects according to various embodiments described herein.

A mapping module 600 may be configured to facilitate the transfer of data between one or more engines 601-604 and/or to facilitate the transfer of data between one or more engines 601-604 and a data store 308 which may include an object library 502 (FIG. 10). Additionally, the mapping module 600 may output data which may be used to move the robot 100, arm 200, and/or effector suite 220. In some embodiments, a data store 308 may be remote from the robot 100. The robot 100 may access the data store 308 through a wired or wireless network connection. Additionally, two or more robots 100 may contribute to and access data in a data store 308 such as an object library 502 (FIG. 10). In further embodiments, a memory 25 local to a robot may function as a data store 308.

A touch engine 602 may be configured to receive touch data from one or more body touch sensors 35 and/or arm touch sensors 36. This touch data may be received when portions of a robot 100 comprising a touch sensor 35, 36, contact an object intentionally or as directed by the processing unit 21, unintentionally without direction from the processing unit 21, and/or from moving potions of the robot 100, such as an accessory mount 221 of an effector suite 220 across a surface of an object or obstacle.

Similarly, a distance engine 603 may be configured to receive distance data from one or more distance sensors 37. This distance data may include scans 605, 606, (FIG. 9) of objects and/or distance data between a distance sensor 37 or portion of the robot 100 and a surface of an object or obstacle in the environment.

A mapping engine 601 may be configured to build a data structure that represents the positions where it has detected obstacles, e.g. surfaces and objects using touch data and/or distance data. This data structure may be a map of the local environment and is sometimes referred to herein as a "map". One representation of such a map is as a 2 or 3 dimensional array of numbers that indicate likelihood that a particular feature (such as a wall) is in a particular position (represented by the array indices). The map may take on other forms as known to those skilled in the art, such as an array or linked list of non-zero locations in the map. Touch data from a touch sensor 35, 36, provided by the touch engine 602 could be used to map near objects 401. Conversely distance data from a distance sensor 37 provided by the distance engine could provide data not available through touch, such as the position of features that are beyond the reach of the touch sensor 35, 36, or data on features that have not yet been touched.

In some embodiments, once the mapping engine 601 has created a touch data map and a distance map, the fusion engine 604 may then fuse the two maps into a single map through a combination of knowledge of the positional calibration between the touch 35, 36, and non-touch 37 sensors and/or by aligning the maps based on features that appear on both maps. In particular, rough fusing can occur through the knowledge of the positional calibration of the touch 35, 36, and non-touch 37 sensors, with fine adjustment of the relative positions of the maps occurring through matching features that appear on both maps. In alternative embodiments, a fusion engine 604 may receive touch data and distance senor data and may fuse or combine the data. The fused data may then be supplied to the mapping engine 601 which may then make a single map comprising both touch data and distance senor data.

In preferred embodiments, the mapping module 600 may receive a map or map data and use it to determine the position of the robot 100 and/or arm within the environment or in relation to an object. A mapping module 600 may use a particle filter or any other method of determining the position of the robot 100 and/or arm within the environment or in relation to an object. Additionally, the mapping module may be configured to move the robot 100 and/or arm 200 based on a received map or map data and the determined position of the robot 100 and/or arm 200.

FIG. 12 shows a block diagram of an example of a method for combining sensor data to perform a goal directed action ("the method") 700 according to various embodiments described herein. In some embodiments, the method may start 701 with receiving distance sensor data from a distance sensor 37 in step 702. In some embodiments, step 702 may be performed by a distance engine 603 which may provide the distance data comprising distance measurements to a mapping engine 601 and/or a fusion engine 604.

Next, in step 703, touch data may be received by a touch sensor 35, 36. In some embodiments, step 703 may be performed by a touch engine 602 which may provide the touch data received by contacting an object or surface to a mapping engine 601 and/or a fusion engine 604.

In step 704, the distance data and touch data may be combined by the processing unit of the mobile robot apparatus 100. In some embodiments, once the mapping engine 601 has created a touch data map and a distance map, the fusion engine 604 may then fuse the two maps into fused or combined data comprising a single map through a combination of knowledge of the positional calibration between the touch 35, 36, and non-touch 37 sensors and/or by aligning the maps based on features that appear on both maps. In alternative embodiments, a fusion engine 604 may receive touch data and distance senor data and may fuse or combine the data. The fused or combined data may then be supplied to the mapping engine 601 which may then make a single map comprising both touch data and distance senor data.

Finally, in step 705, the combined distance data and touch data may be used to manipulate the robot apparatus 100 to complete the goal directed action. In preferred embodiments, the mapping module 600 may receive a map or map data and use it to determine the position of the robot 100 and/or arm within the environment or in relation to an object. A mapping module 600 may use a particle filter or any other method of determining the position of the robot 100 and/or arm within the environment or in relation to an object. Additionally, the mapping module may be configured to move the robot 100 and/or arm 200 based on a received map or map data and the determined position of the robot 100 and/or arm 200. By moving the robot 100 and/or arm 200, the robot apparatus 100 may be manipulated to complete a goal directed action such as cleaning, polishing, drying, washing, buffing, sanding, dusting, painting, or any other type of action or activity. For example, a cleaning pad accessory 300 may be secured to the accessory mount 221 of an effector suite 220 which is coupled to the distal end 212 of an arm 200 of a robot 200. The robot 100 may move into proximity of an object 401 and then move the arm 200 to rub the cleaning pad across the object, thereby completing the goal directed action of cleaning a portion of the object 401. Once step 705 has been completed, the method 700 may finish 706.

While some materials have been provided, in other embodiments, the elements that comprise the robot 100 such as the body 11, movable arm 200, and/or any other element discussed herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the tool 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the robot 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the robot 100 may be coupled by being one of connected to and integrally formed with another element of the robot 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for operating a robot using robotic touch perception, the method comprising:
   receiving, at a processor from a touch sensor, touch data associated with an object, the touch data including measurements of force feedbacks received by the touch sensor when forces are applied by the robot to the object, wherein generating the touch data comprises:
      directing a part of the robot carrying the touch sensor towards the object;
      attempting to move the object for a distance; and
      detecting force values in attempting to move the object;
   determining, based on the touch data associated with the object, whether the object is movable;
   moving, in response to a determination that the object is movable, the object by the robot from an original location to another location; and
   controlling the robot to perform a goal directed action relative to the original location.

2. The method of claim 1, further comprising:
   detecting one or more attributes of the object;
   storing the attributes of the object in an object library; and
   marking the object as movable.

3. The method of claim 2, wherein the one or more attributes comprise image data and touch data.

4. The method of claim 2, wherein the one or more attributes comprise an expected amount of force required to move the object.

5. The method of claim 1, wherein attempting to move the object for the distance comprises:
   moving an arm of the robot towards a surface of the object until pressure is first detected at a position of the arm;
   attempting to move the arm further towards the surface until the pressure reaching a specific maximum allowable pressure; and
   returning the arm to the position of the arm in which the pressure is first detected.

6. The method of claim 1, further comprising determining a contour of the object.

7. The method of claim 6, wherein determining the contour of the object comprises:
   directing a part of the robot carrying the touch sensor towards a surface of the object; and
   directing the part carrying the touch sensor to move in two or more directions of travel across the surface while maintaining contact of the touch sensor with the surface.

8. The method of claim 1, wherein the goal directed action corresponds to a movement of a part of the robot along a surface.

9. The method of claim 1, wherein the goal directed action corresponds to a cleaning task.

10. The method of claim 1, further comprising generating a three-dimensional map of touch data characteristics of the object.

11. The method of claim 1, further comprising
   attempting to move a second object;
   determining, based on touch data associated with the second object, that the second object is beyond a capacity of the robot to move the second object; and causing the robot to cancel an attempt to move the second object.

12. A robot comprising:
 a robotic arm;
 a touch sensor carried by the robotic arm, the touch sensor configured to generate touch data associated with an object, the touch data including measurements of force feedbacks received by the touch sensor when forces are applied by the robot to the object, wherein generating the touch data comprises:
  directing the robotic arm carrying the touch sensor towards the object;
  attempting to move the object for a distance; and
  detecting force values in attempting to move the object; and
 a processor in communication with the robotic arm and with the touch sensor; and
 memory coupled to the processor, the memory storing instructions, the instructions, when executed by the processor, cause the processor to perform steps comprising:
  determining, based on the touch data associated with the object, whether the object is movable;
  directing, in response to a determination that the object is movable, the robotic arm to move the object from an original location to another location; and
  directing the robotic arm to perform a goal directed action relative to the original location.

13. The robot of claim 12, wherein the steps further comprise:
 detecting one or more attributes of the object;
 storing the attributes of the object in an object library; and
 marking the object as movable.

14. The robot of claim 13, wherein the one or more attributes comprise image data and touch data.

15. The robot of claim 13, wherein the one or more attributes comprise an expected amount of force required to move the object.

16. The robot of claim 12, wherein attempting to move the object for the distance comprises:
 moving an arm of the robot towards a surface of the object until pressure is first detected at a position of the arm;
 attempting to move the arm further towards the surface until the pressure reaching a specific maximum allowable pressure; and
 returning the arm to the position of the arm in which the pressure is first detected.

17. The robot of claim 12, wherein the steps further comprise determining a contour of the object.

18. The robot of claim 17, wherein determining the contour of the object comprises:
 directing the robotic arm carrying the touch sensor towards a surface of the object; and
 directing the robotic arm carrying the touch sensor to move in two or more directions of travel across the surface while maintaining contact of the touch sensor with the surface.

19. The robot of claim 12, wherein the goal directed action corresponds to a movement of a part of the robot along a surface.

20. The robot of claim 12, wherein the goal directed action corresponds to a cleaning task.

21. The robot of claim 12, wherein the steps further comprise generating a three-dimensional map of touch data characteristics of the object.

22. The robot of claim 12, wherein the steps performed by the processor further comprise:
 attempting to move a second object;
 determining, based on touch data associated with the second object, that the second object is beyond a capacity of the robot to move the second object; and
 causing the robot to cancel an attempt to move the second object.

* * * * *